United States Patent
Koga et al.

(10) Patent No.: US 6,526,023 B1
(45) Date of Patent: Feb. 25, 2003

(54) TRAFFIC CONTROL APPARATUS

(75) Inventors: Hisashi Koga, Kanagawa (JP); Takashi Sugino, Kanagawa (JP); Toshiaki Ohishi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/373,359

(22) Filed: Aug. 12, 1999

Related U.S. Application Data

(62) Division of application No. 08/552,485, filed on Nov. 9, 1995, now Pat. No. 5,963,541.

(30) Foreign Application Priority Data

Nov. 9, 1994 (JP) .............................................. 6-275359

(51) Int. Cl.[7] .............................................. H04Q 11/04
(52) U.S. Cl. ...................... 370/230; 370/235; 370/412; 370/429
(58) Field of Search ................................. 370/229, 231, 370/234, 235, 391, 413, 414, 415, 416, 417, 418, 438, 442, 230, 230.1, 412, 428, 429

(56) References Cited

U.S. PATENT DOCUMENTS

| | | | |
|---|---|---|---|
| 5,263,080 A | | 11/1993 | Jones et al. |
| 5,373,504 A | | 12/1994 | Tanaka et al. |
| 5,426,635 A | * | 6/1995 | Mitra et al. .................. 370/391 |
| 5,428,616 A | | 6/1995 | Field et al. |
| 5,487,152 A | * | 1/1996 | Young ......................... 370/438 |
| 5,509,001 A | | 4/1996 | Tachibana et al. |
| 5,537,405 A | | 7/1996 | Yoshifuji |
| 5,588,003 A | | 12/1996 | Ohba et al. |
| 5,696,764 A | | 12/1997 | Soumiya et al. |
| 5,805,595 A | | 9/1998 | Sharper et al. |
| 5,963,541 A | * | 10/1999 | Koga et al. .................. 370/229 |

OTHER PUBLICATIONS

C. R. Kalmanek et al. 'Hierarchical Round Robin: A Service Discipline for Very High–Speed Networks' presented by S. Keshav at XUNET Student Meeting, Chicago, Ill., Feb. 26, 1990, Feb. 16, 1990.*

* cited by examiner

*Primary Examiner*—Douglas Olms
*Assistant Examiner*—Shick Hom
(74) *Attorney, Agent, or Firm*—Katten Muchin Zavis Rosenman

(57) ABSTRACT

A time division allocating portion distributes a plurality of data links at a plurality of time division timings into which a predetermined period is divided. A remaining communication data supplying process executing portion executes a supplying process of remaining communication data for a data link allocated by the time division allocating portion at the time division timing only when the remaining communication data supplying process commanding portion commands the execution of the supplying process of the remaining communication data for the data link.

10 Claims, 24 Drawing Sheets

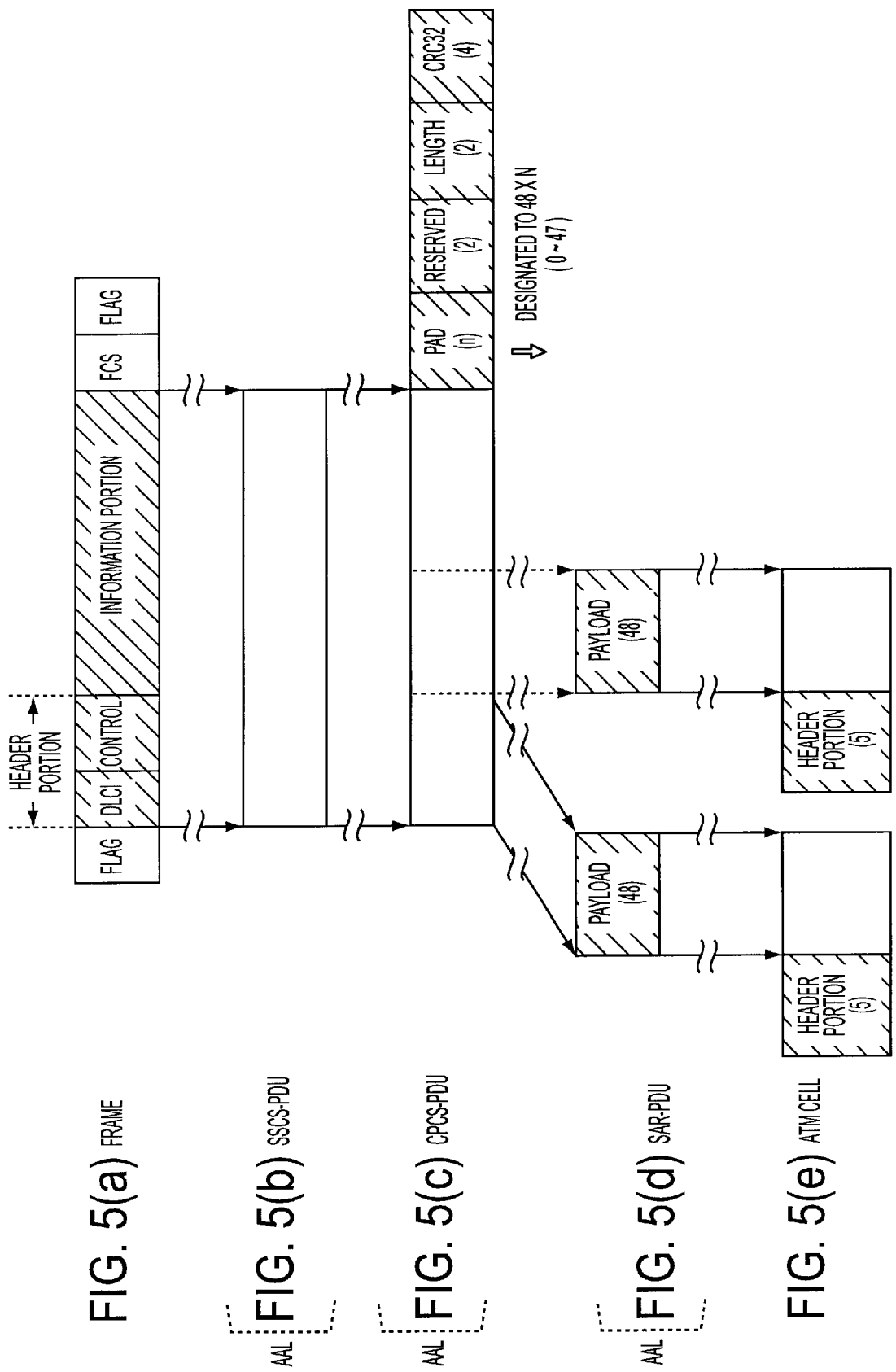

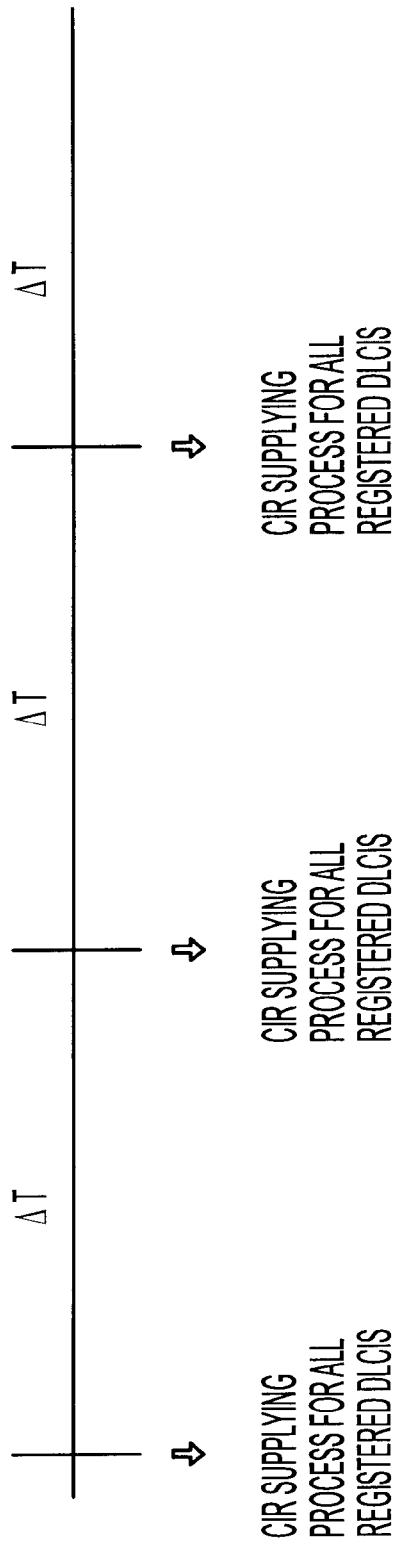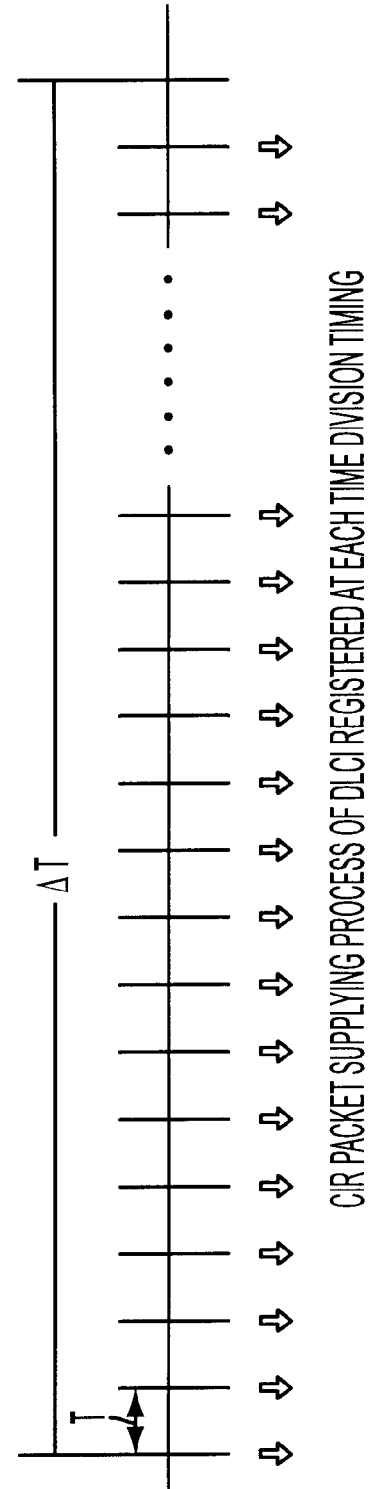

TRAFFIC CONTROL APPARATUS

This application is a division of Ser. No. 08/552,485, filed Nov. 9, 1995, now U.S. Pat. No. 5,963,541.

BACKGROUND OF THE INVENTION

1. Field of the Invention

The present invention relates to a traffic control apparatus for use with a frame relay communication and so forth.

2. Description of the Related Art

In recent years, a frame relay communication method that reduces a frame transfer time of a conventional packet switching unit has become popular. In the frame relay communication method, since an acknowledge operation of an information transfer made between subscriber terminals and the network, a retransmission control upon an occurrence of an error, and so forth, are performed by a sending subscriber terminal and a receiving subscriber terminal, the communication control of the network can be dramatically simplified. Thus, a high speed frame communication can be accomplished.

When a frame relay communication is executed, a physical channel (PLN) on which at least one time slot timing of a PCM line is allocated, is defined between a sending subscriber terminal and a receiving subscriber terminal. In addition, a plurality of data links that use the PLN are defined. When a subscriber uses the data link, he can communicate multiplexed information comprised of a plurality of types of data with a remote subscriber on one PLN. On the PLN, information is transmitted with a data unit that is referred to as a frame. The frame is composed of a header portion and an information portion. In the information portion of the frame, communication information is placed. In the header portion of the frame, a data link connection identifier (DLCI) that represents the relationship between communication information placed in the information portion of the frame and a data link, is placed.

In the network, a frame relay node unit that controls the frame relay communication is provided. The frame relay node unit identifies the timing of a time slot in which the frame is placed so as to identify the PLN of the frame. In addition, the frame relay node unit identifies the DLCI placed in the header portion of the frame so as to identify the data link of the frame. In this case, the frame relay node unit executes a traffic control (that is referred to as a committed information rate (CIR) control) for each data link of each PLN. Generally, the CIR control is a control method based on a traffic control method that is referred to as the Leaky Bucket method. Parameters and meanings used in the CIR method are as follows.

1. CIR (Committed Information Rate)
    Transfer bit rate between a subscriber terminal and a frame relay node unit in a normal transfer state.
2. EIR (Excess Information Rate)
    Transfer bit rate between a subscriber terminal and a frame relay node in a burst transfer state.
3. BC (Committed Burst Size)
    Transfer data amount per unit period (Tc) at CIR.
4. BE (Excess Burst Rate) Transfer data amount per unit period (Tc) at EIR.
5. CB (Committed Burst)
    Remaining data amount transmittable by a subscriber terminal in each period $\Delta T$ under the CIR control in the normal transfer state (packets).
6. EB (Excess Burst)
    Remaining data amount transmittable by a subscriber terminal in each period $\Delta T$ under the CIR control in the burst transfer state (bursts).
7. CIR$\Delta T$
    Data amount supplied in a CB per period $\Delta T$ under the CIR control in the normal transfer state. CIR$\Delta T$ is equivalent to CIR$\times \Delta T$.
8. EIR$\Delta T$
    Data amount supplied in an EB at each period $\Delta T$ under the CIR control in the burst transfer state. EIR$\Delta T$ is equivalent to EIR$\times \Delta T$.

When a data link is established, a subscriber contracts parameters BC and BE with a network provider. As described above, the parameter BC represents the data amount transferred between the subscriber terminal and a frame relay node unit per unit period (Tc) using the data link in the normal transfer state. On the other hand, the parameter BE represents the data amount transferred between the subscriber terminal and the frame relay node in the unit period (Tc) using the data link in the burst transfer state. The normal transfer state represents a period at which information is regularly transferred (normal communication state). The burst transfer state represents a period at which a large amount of information (such as image data) is instantaneously transmitted. The parameters BC and BE that are contracted amounts are equivalent to the transfer bit rates CIR and EIR, respectively. The frame relay node unit allocates a DLCI to the established data link, a buffer to DLCI, and various parameters including the BC and BE of the subscriber to the buffer.

When the frame relay node unit starts a frame relay communication corresponding to a set of a PLN and a DLCI, it designates the contracted amount BC corresponding to the PLN and the DLCI to a parameter CB that represents the remaining data amount in the unit period (Tc) in the normal transfer state. In addition, the frame relay node unit designates the contracted amount BE to a parameter EB that represents the remaining data amount per unit period (Tc) corresponding to PLN and DLCI. The frame relay node unit determines the PLN on which a frame has been received and the DLCI placed in the header portion of the frame so as to execute the CIR control for each PLN and each data link (DLCI).

When the frame relay node unit receives a frame, it subtracts the data amount of the frame from the value of the CB corresponding to the PLN and the DLCI of the frame. This process is executed until the value of the CB corresponding to the PLN and the DLCI is equal to or less than 0 whenever a frame is received. While the condition of $0 < CB \leq BC$ is satisfied, the data amount of the subscriber terminal using the PLN and the DLCI does not exceed the contracted amount in the normal transfer state.

When the value of the CB is equal to or less than 0 for each PLN and each DLCI, the data amount thereof exceeds the contracted amount in the normal transfer state. When the frame relay node unit further receives a frame corresponding to the PLN and the DLCI in the condition that $CB \leq 0$, it sets a flag to the DE bit of the frame. In addition, the frame relay node unit subtracts the data amount of the frame from the value of the EB corresponding to the PLN and the DLCI thereof. Whenever the frame relay node unit receives a frame, it executes this process until the condition of $EB \leq 0$ corresponding to the PLN and the DLCI of the frame is satisfied. While the relation of $0 < EB \leq BE$ for each PLN and each DLCI is satisfied, the data amount of the subscriber terminal that uses the PLN and the DLCI does not exceed the contracted amount in the burst transfer state.

When the value of the EB for each PLN and each DLCI is equal to or less than 0, the data amounts of the PLN and the DLCI exceed the contracted amounts in the burst transfer state. When the frame relay node unit further receives a frame corresponding to the PLN and the DLCI of which EB≦0, it does not transfer the frame to the network, but discards it. The frame relay node unit determines the values of the CB and the EB, which are the remaining data amounts that the subscriber terminal can transmit in the normal transfer state and the burst transfer state, corresponding to the contracted amounts BC and BE per unit period (Tc). Thus, the values (contents) of the CB and the EB that are data packets should be supplied (compensated) at least every unit period (Tc). In practice, the frame relay node unit supplies supply data amounts CIRΔT and EIRΔT corresponding to each PLN and each DLCI to the values of the CB and the EB thereof every period ΔT that is shorter than the unit period (Tc). As a result, when the values of the CB and the EB exceed the values of the BC and the BE corresponding thereto, the values of the CB and the EB are set to BC and BE (in full state), respectively.

However, in such a supplying process, the following problem will take place. The frame relay node unit may process a large number of PLNs and DLCIs. Conventionally, the frame relay node unit executes a supplying process for CBs and EBs corresponding to PLNs and DLCIs in each period ΔT. Thus, when the number of PLNs and DLCIs are large, the frame relay node unit should collectively execute the process in each period ΔT. Consequently, the other processes of the CIR controlling processor of the frame relay node unit are delayed. As a result, the CIR controlling process is also delayed.

On the other hand, the process performance of the frame relay node unit depends on the process time for one frame. In other words, the process performance of the frame relay node unit accords with the number of frames that can be processed per unit period. Thus, when frames that exceed the process performance of the frame relay node unit are input, a so-called congestion control should be performed. On the other hand, in the frame relay node unit, the above-described CIR control should be executed. However, a control method for cooperatively and effectively executing the congestion control and the CIR control is not known in the frame relay communication method.

In addition, the frame relay node unit should perform various processes such as the CIR control and the congestion control along with the frame sending and receiving process, and the efficiency of the frame sending and receiving processes should be considered.

The above-mentioned problems are not limited to the frame relay communication method. Instead, these problems may happen in other communication methods.

SUMMARY OF THE INVENTION

The present invention is conceived to answer the above-described problems. An object of the present invention is to effectively designate traffic parameters for data links at every predetermined period in a frame relay communication or the like, to cooperatively and effectively execute a hierarchical traffic control process, and effectively execute a sending and receiving process for frames or the like along with the traffic control process.

The present invention is a traffic control apparatus for executing a supplying process of remaining communication data for a plurality of data links in a frame relay communication at each predetermined period, comprising a time division allocating portion for allocating the data links in a plurality of time division timings into which the designated period is divided, and a remaining communication data supplying process executing portion for executing the supplying process of the remaining communication data corresponding to the data links allocated by the time division allocating portion at each of the time division timings.

In the above-described configuration of the present invention, a remaining communication data supplying process commanding portion can be further provided. The remaining communication data supplying process commanding portion represents whether or not the supplying process of the remaining communication data for each data link can be executed. In this case, the remaining communication data supplying process executing portion executes the supplying process of the remaining communication data for the data link only when the remaining communication data supplying process commanding portion commands the remaining communication data supplying process executing portion to execute the supplying process of the remaining communication data for a data link.

In the configuration of this aspect of the present invention, since the supplying process of the remaining communication data is distributed in time division timings into which a particularly designated period is divided, the concentration of the process can be prevented.

The present invention is not limited to the frame relay communication. Instead, when traffic data is periodically designated in another communication method, since a designated process is distributed in a plurality of time division timings, the concentration of the process can be prevented.

In addition, when the process is allocated in each time division timings so that the number of data links is equally allocated, the process can be equally executed.

Moreover, when the remaining communication data supplying process commanding portion is further provided, the supplying process of the remaining communication data can be effectively executed.

Furthermore, in another communication method other than the frame relay communication, when the designating process of traffic data for each of a plurality of data links is periodically performed, the designating process of the traffic data can be effectively executed.

These and other objects, features and advantages of the present invention will become more apparent in light of the following detailed description of best mode embodiments thereof, as illustrated in the accompanying drawings.

BRIEF DESCRIPTION OF DRAWINGS

FIG. 5 is a schematic diagram showing the relation between data formats of a frame and an ATM cell;

FIGS. 6A and 6B are schematic diagrams for explaining a CIR packet supplying process;

DESCRIPTION OF PREFERRED EMBODIMENTS

Theoretical Description

Figure 1:
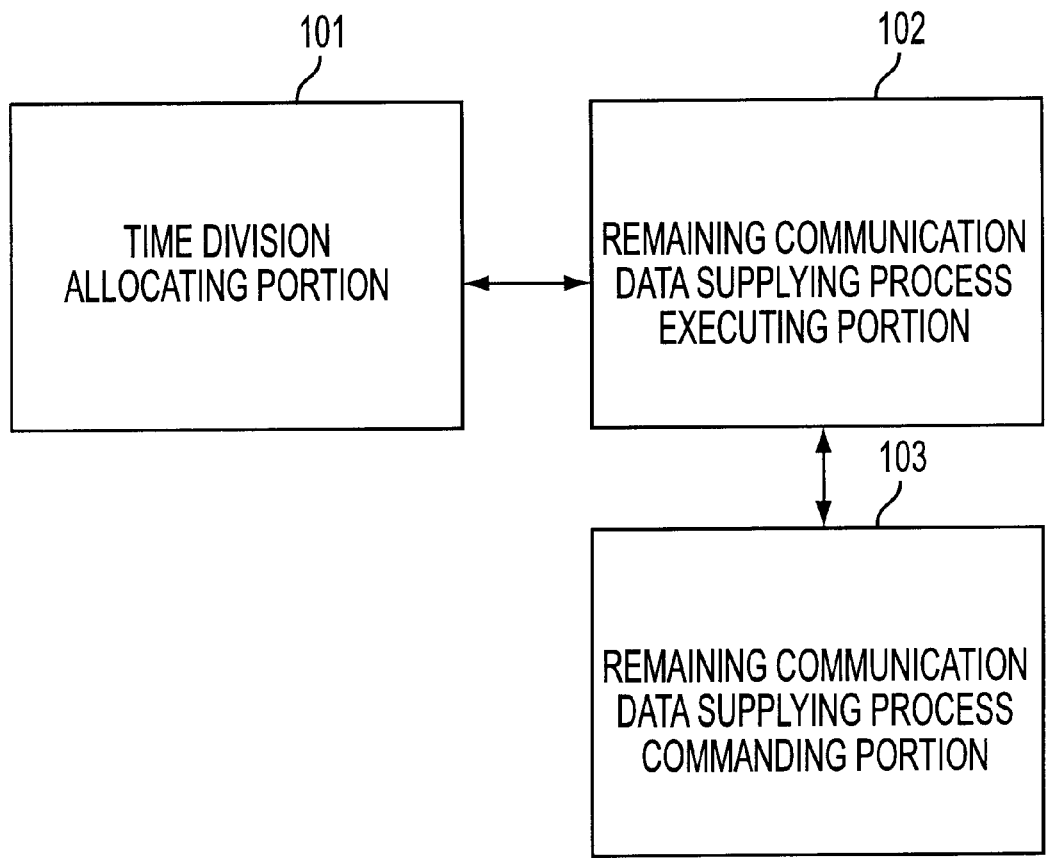
FIG. 1 is a theoretical block diagram of the present invention (No. 1)
Figure 2:
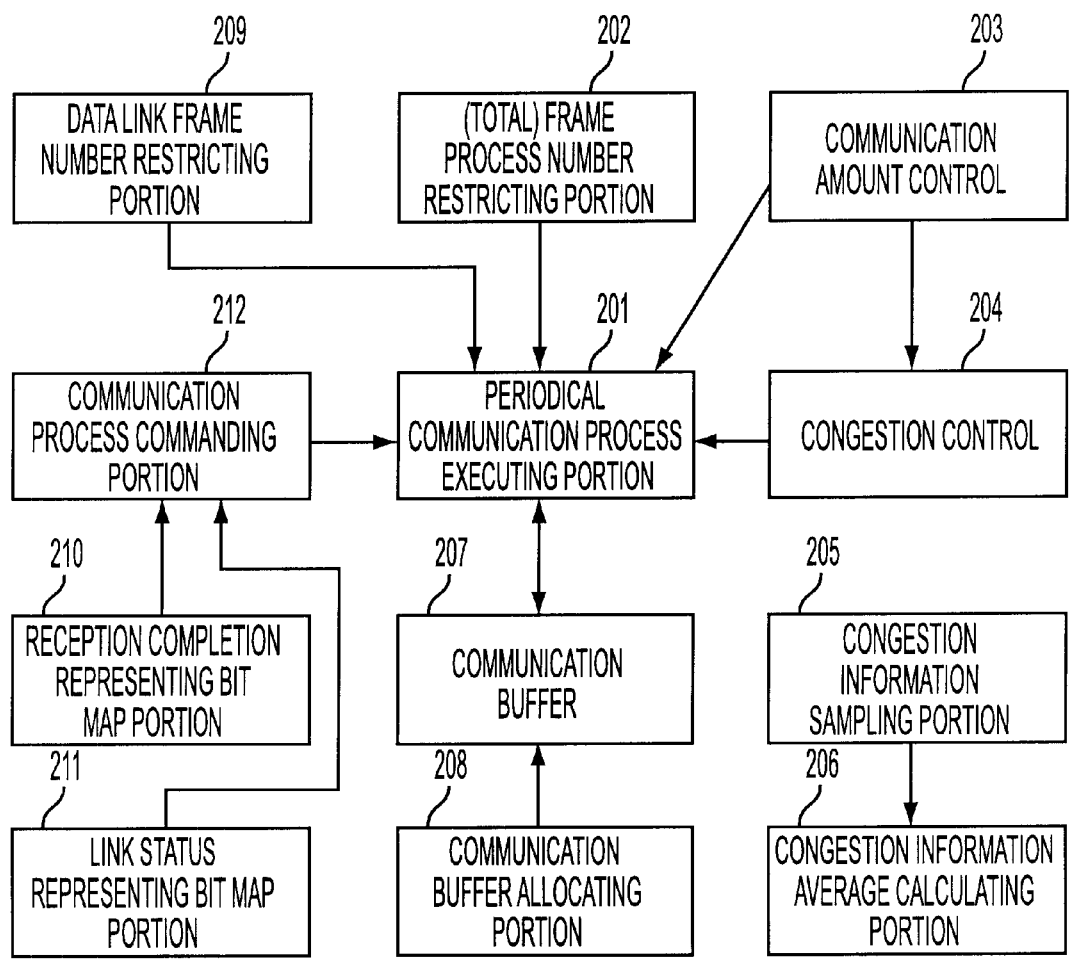
FIG. 2 is a theoretical block diagram of the present invention (No. 2)

FIGS. 1 and 2 are theoretical block diagrams of a traffic control method to which the present invention is applied for the frame relay communication method.

A first aspect of the present invention is a traffic control apparatus that executes a supplying process of remaining communication data (CIR packets) for a plurality of data links (DLCIs) in a frame relay communication in each predetermined period, comprising a time division allocating portion 101 and a remaining communication data supplying process executing portion 102 shown in FIG. 1.

The time division allocating portion 101 allocates the data links in a plurality of time division timings into which the designated period is divided.

The remaining communication data supplying process executing portion 102 executes the supplying process of the remaining communication data corresponding to the data links allocated by said time division allocating portion 101 in each of the time division timings.

According to the first aspect of the present invention, since the supplying process of the remaining communication data is distributed in each time division timing into which a predetermined designated period is divided, the concentration of the process can be prevented.

The present invention is not limited to the frame relay communication. Instead, in the case that traffic data is periodically designated, when the designating process is distributed at a plurality of time division timings, the concentration of the process can be prevented.

A second aspect of the present invention is the apparatus according to the first aspect shown in FIG. 1, wherein the time division allocating portion 101 equally distributes the data links at the time division timings so that the number of data links allocated to each of the time division timings is equal.

According to the second aspect of the present invention, since the number of data links is equally allocated in each time division timing, the process can be performed equally.

A third aspect of the present invention is the apparatus according to the first aspect shown in FIG. 1, further comprising a remaining communication data supplying process commanding portion 103 that commands the execution of the supplying process of the remaining communication data for each data link.

The remaining communication data supplying process executing portion 102 executes the supplying process of the remaining communication data for the data links only when the remaining communication data supplying process commanding portion 103 has commanded the execution of the supplying process of the remaining communication data to the data links.

According to the third aspect of the present invention, when the supplying process of the remaining communication data for the data links is executed, the remaining communication data supplying process commanding portion 103 is referenced. Only when the supplying process has been commanded, the supplying process is executed. Thus, the efficiency of the supplying process for the remaining communication data is improved.

In another communication method, rather than the frame relay communication method, when the designating process of the traffic data is periodically performed for every several data links, a predetermined commanding portion is referenced so as to determine whether or not to execute the designating process of traffic data for each data link. Thus, the efficiency of the designating process of traffic data can be improved.

A fourth aspect of the present invention is a traffic control apparatus that controls the traffic of frames in a frame relay communication, comprising a periodical communication process executing portion 201 and a processing frame number restricting portion 202 shown in FIG. 2. The periodical communication process executing portion 201 periodically executes the communication process of the frames.

The processing frame number restricting portion 202 restricts the number of frames processed by the communication process period executing portion 201 in one period.

According to the fourth aspect of the present invention, the communication process is periodically executed in each of predetermined periods. Thus, the number of frames to be processed is restricted. Consequently, the communication process for frames received in the period can be finished.

The present invention is not limited to the frame relay communication method. Instead, in another communication method, when the sending process and the receiving process for the communication information are periodically executed and the communication amount to be processed is restricted, other processes are not affected by the sending process and the receiving process.

A fifth aspect of the present invention is a traffic control apparatus that executes a congestion control for physical channels and a communication amount control for data links that use physical channels in a frame relay communication, comprising a traffic control executing portion that executes the congestion control (204 of FIG. 2) for the physical channels that use the data channels, after the communication amount control (203 of FIG. 2) for the data links is executed.

According to the fifth aspect of the present invention, first the communication amount control such as a CIR control corresponding to a data link is executed. For example, after the frame is stored to a queue corresponding to a physical channel of the frame, a congestion control is executed for the physical channel (queue). Thus, a congestion state does not take place even if a frame of a data link that exceed the contracted data amount is received.

The present invention is not limited to such a relationship. In another communication system, when traffic controls are executed for a plurality of logical links included in a physical link (namely, in a hierarchical traffic structure), since the traffic control is executed in the order of inner hierarchical traffics, congestion due to the communication of a traffic that complies with a predetermined rule can be prevented.

A sixth aspect of the present invention is a traffic control apparatus that calculates congestion information in a first sampling period corresponding to congestion information sampled in a plurality of sampling periods that precede and follow the first sampling period and that includes the first sampling period, comprising a congestion information sampling portion 205 shown in FIG. 2 and an average congestion information calculating portion 206 shown in FIG. 2.

The congestion information sampling portion 205 samples the congestion information in a plurality of second sampling periods into which the first sampling period is divided.

The average congestion information calculating portion 206 calculates the average value of the congestion information sampled by the congestion information sampling portion 205 in each of the second periods and outputs the average value as the congestion information sampled in the first sampling period.

According to the sixth aspect of the present invention, in the congestion control method for use with the frame relay communication method, the congestion information is smoothed for the first sampling periods. In addition, the congestion information is averaged in the second sampling periods. Thus, even if each of the first sampling periods becomes relatively long due to a congestion monitoring process, congestion information can be stably obtained.

A seventh aspect of the present invention is a traffic control apparatus for use with a frame relay communication system that performs a frame relay communication with communication buffers 207, comprising a communication buffer allocating portion 208 shown in FIG. 2.

The communication buffer allocating portion 208 allocates a communication buffer 207 with a storage capacity corresponding to the number of time slots of a physical channel to each data link for the frame relay communication.

According to the seventh aspect of the present invention, since a communication buffer 207 with a storage capacity corresponding to the number of time slots of a physical channel of a data link for a frame relay communication is allocated, the buffering process can be performed corresponding to the size of a physical channel.

The present invention is not limited to the frame relay communication. Instead, in another communication method, a communication buffer can be allocated corresponding to the transmission band of a data link.

An eighth aspect of the present invention is a traffic control apparatus for use with a frame relay communication that performs a frame relay communication with a communication buffer 207, comprising a communication buffer allocating portion 208 shown in FIG. 2. The communication buffer allocating portion 208 allocates a communication buffer 207 with a storage capacity corresponding to a contracted amount of a frame relay communication (for example, the sum of CIR values for all DLCIs of the physical channel) to each data link.

According to the eighth aspect of the present invention, since a communication buffer 207 with a storage capacity corresponding to the contracted amount of the frame relay communication is allocated to each data link, the buffering process can be performed corresponding to the contracted amount.

The present invention is not limited to the frame relay communication. Instead, in another communication method, a communication buffer with a storage capacity corresponding to a traffic control amount can be allocated to each data link.

A ninth aspect of the present invention is the apparatus according to the seventh aspect, further comprising a periodical communication process executing portion 201, a total frame number restricting portion 202, and a frame number restricting portion 209.

The periodical communication process executing portion 201 periodically executes the communication process for frames in the frame relay communication.

The total frame number restricting portion 202 restricts the total number of frames in all the data links processed by the periodical communication process executing portion 201 in one period.

The frame number restricting portion 209 restricts the number of frames communicated for each data link in one period corresponding to the storage capacity of the communication buffer 207 allocated to the data link by the communication buffer allocating portion 208.

According to the ninth aspect of the present invention, the communication process for frames is activated in each of predetermined periods. The communication process is executed for frames that can be processed in a plurality of data links in each of the periods. The number of frames corresponding to each data link processed is restricted corresponding to the storage capacity of a communication buffer 207 allocated to the data link. Thus, the frame relay communication process is properly executed corresponding to the communication capacity of each data link.

The present invention is not limited to the frame relay communication method. Instead, in another communication method, the amount of communication information can be designated so that it accords with the storage capacity of the buffer allocated to each data link.

A tenth aspect of the present invention is a traffic control apparatus that executes a communication process for a plurality of data links that are used for communications, comprising a reception completion representing bit map portion 210, a link status representing bit map portion 211, and a communication process commanding portion 212 shown in FIG. 2.

The reception completion representing bit map portion 210 stores bit information that represents whether or not communication information for each of the data links has been received with a logical value 1 or 0 at the bit position corresponding to the data link.

The link status representing bit map portion 211 stores bit information that represents whether or not each data link is valid with a logical value 1 or 0 at the bit position corresponding to the data link.

The communication process commanding portion 212 ANDs the value at each bit position of the reception completion representing bit map and the value at the corresponding bit position of the link status representing bit map portion 211 and commands the communication process for a data link only when the value at the resultant bit position corresponding to the data link is 1.

According to the tenth aspect of the present invention, each bit of the reception completion representing bit map portion 210 is set to 1 by hardware when communication information has been received by a data link corresponding to the bit position of the bit. In other words, for example, the periodical communication process executing portion 201 does not need to execute the communication process whenever a reception interrupt of communication information takes place. Instead, with reference to the value of each bit of the reception completion representing bit map portion 210, the periodic communication process executing portion 201 can determine whether or not communication information for a data link corresponding to the bit has been received.

Each bit of the link status representing bit map portion 211 is set when a data link corresponding to the bit is activated by a control unit (not shown) or the like. Each bit is reset to 0 when the data link is invalidated. In other words, for example, with reference to the value of each bit of the link status representing bit map portion 211, the periodical communication process executing portion 201 shown in FIG. 2 can determine whether or not the data link corresponding to the bit can receive the communication information.

For example, the periodical communication process executing portion 201 does not need to individually determine each bit of the above-described two bit map portions. In other words, the communication process commanding portion 212 ANDs the value at each bit position of the reception completion representing bit map portion 210 and the value at each bit position of the link status representing bit map portion 211. Only when the resultant logical value at each bit position is 1, the communication process commanding portion 212 can command the periodical communication process executing portion 201 to execute the communication process for the data link corresponding to the bit position.

Thus, the determination of the validity of the execution of the process of the communication information can be performed at high speed.

An eleventh aspect of the present invention is a traffic control apparatus that collects statistical items of the traffic of each data link, comprising a data area storing portion and traffic statistical item collecting portion (not shown).

The data area storing portion stores a data area in which the statistical items of a designated data link are collected.

The traffic statistical item collecting portion collects the statistical items of the traffic of the designated data link and stores the collected statistical items in the data area.

According to the eleventh aspect of the present invention, in a conventional communication system, traffic data can be collected only from a designated subscriber. Thus, the efficiency for collecting traffic data can be improved.

DESCRIPTION OF PREFERRED EMBODIMENTS

Next, with reference to the accompanying drawings, preferred embodiments of the present invention will be described.

Figure 3:
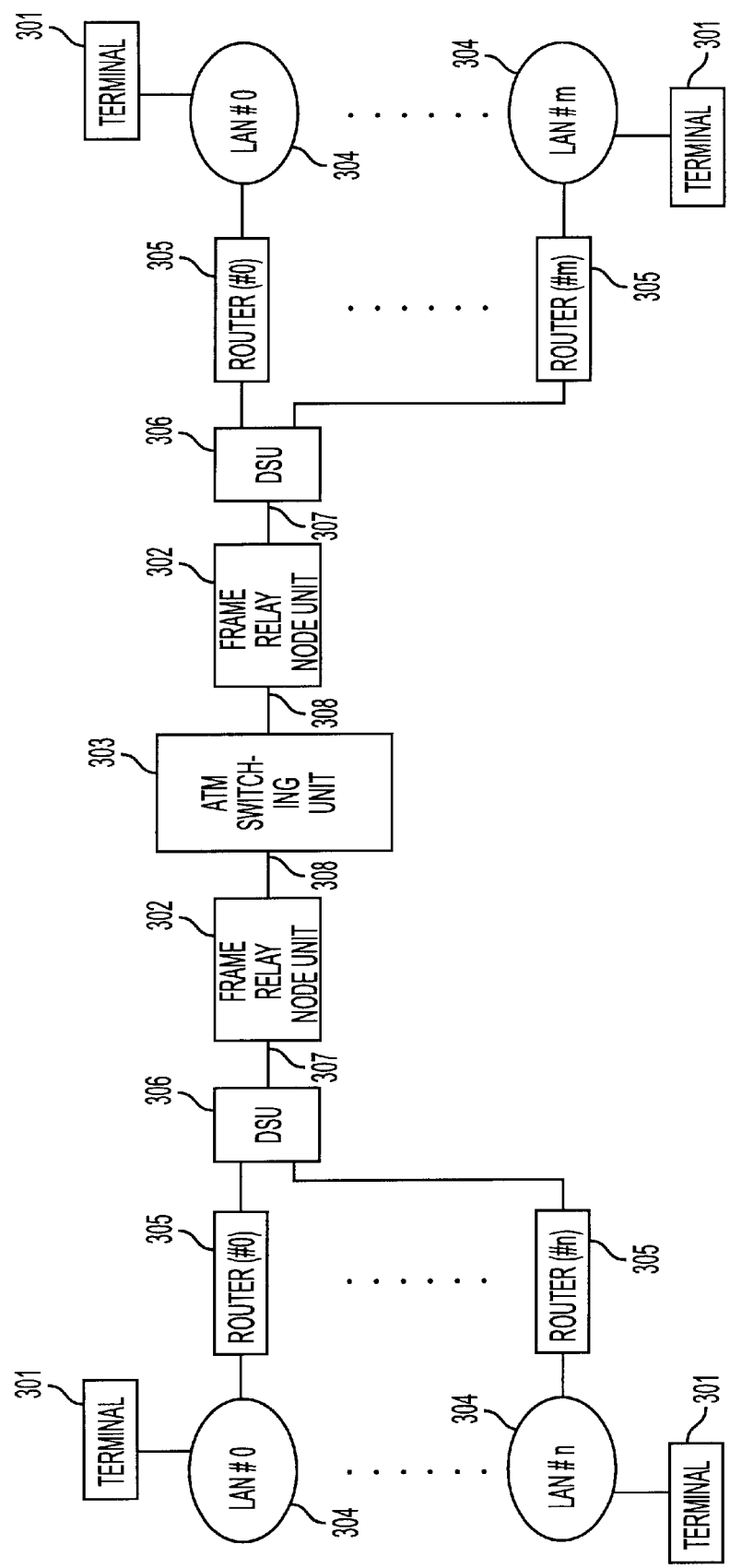
FIG. 3 is a schematic diagram showing the overall construction of a frame relay communication system.

FIG. 3 is a block diagram showing the overall construction of a frame relay communication system according to a preferred embodiment of the present invention.

A terminal 301 that is a subscriber terminal is connected to a frame relay node unit 302 through a local area network (LAN) 304, a router 305, and a data service unit (DSU) 306, and a user network interface 307. The frame relay node unit 302 is connected to an ATM switching unit 303 through an ATM interface 308. The ATM switching unit 303 executes a data switching process corresponding to an asynchronous transfer mode (ATM) method. In other words, in this preferred embodiment, the frame relay communication system is configured based on an ATM network. It should be noted that the frame relay communication system is not limited to be configured based on the ATM network. Instead, the frame relay communication system can be constructed based on one of various network systems.

The user network interface 307 is a PCM digital line in which, for example, 24 time slots are multiplexed and the transfer bit rate is 1.5 Mbps (megabits/second). In this case, the transfer bit rate per time slot is 64 kbps (kilobits/second). A subscriber to the network can configure one physical channel (PLN) with a combination of one of more time slots. On the PLN, the subscriber can perform a frame relay communication.

The ATM interface 308 that is an ATM line with a transfer bit rate of, for example, 150 Mbps for transferring ATM cells.

The frame relay node unit 302 receives a frame from a terminal 301 shown in FIG. 3 through a user network interface 307. The frame relay node unit 302 executes the CIR control and the congestion control for the frame. In addition, the frame relay node unit 302 performs a process for converting the frame into an ATM cell and sending the ATM cell to the ATM switching unit 303 through the ATM interface 308. This process is referred to as an ingress process. In contrast, the frame relay node unit 302 performs a process for receiving an ATM cell from the ATM switching unit 303 through the ATM interface 308, converting the ATM cell into a frame, and sending the frame to the terminal 301 through the user network interface 307. This process is referred to as an egress process.

Figure 4:
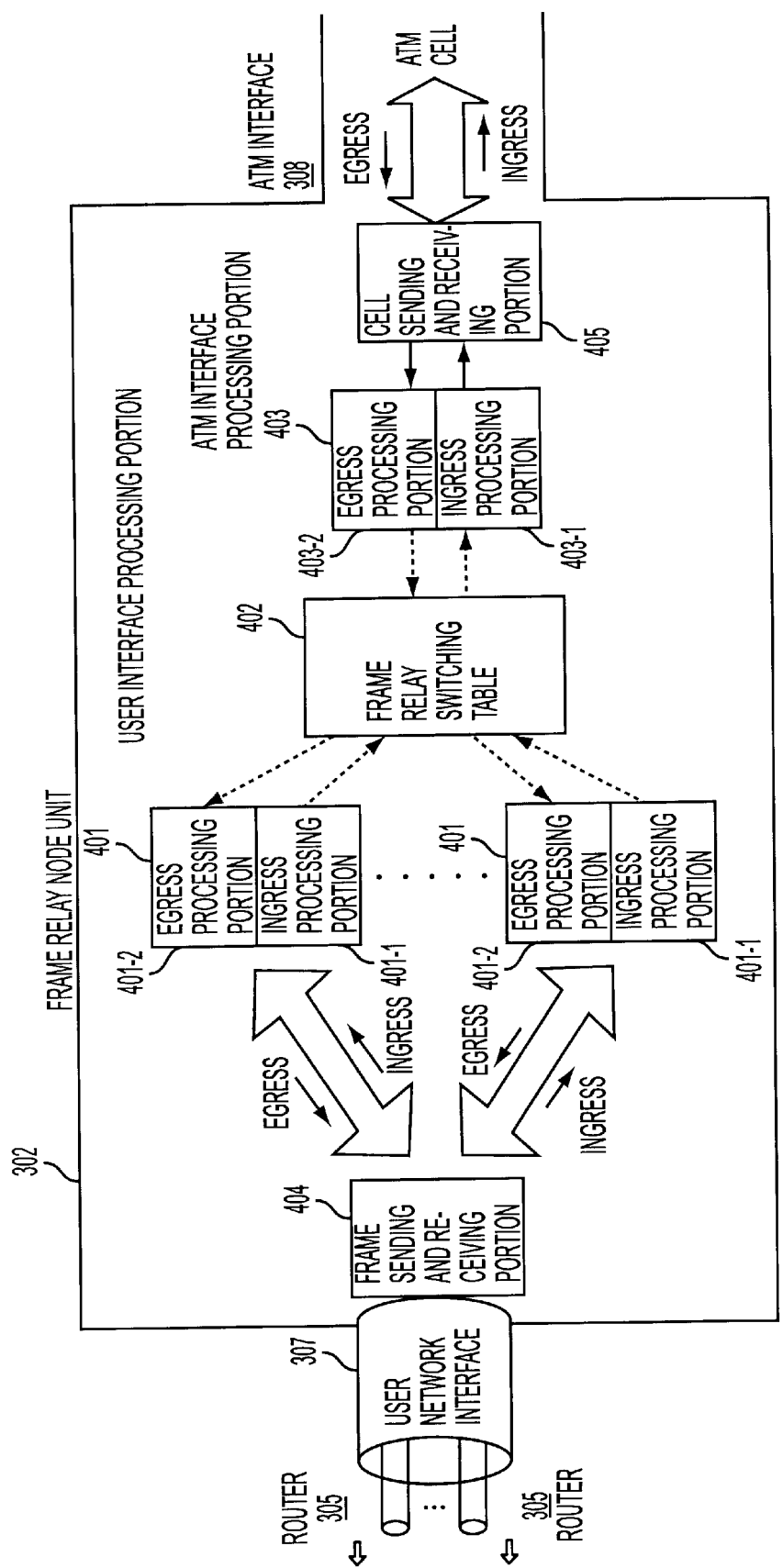
FIG. 4 is a schematic diagram showing a process construction and a data flow of a frame relay node unit.

FIG. 4 is a schematic diagram showing a process configuration in the frame relay node unit 302 and a data flow thereof.

The ingress process is executed in the following manner. A frame sending and receiving portion 404 successively receives frames corresponding to PLNs in time slot timings thereof from the user network interface 307, and stores the frames in corresponding ingress processing buffers of a memory (not shown).

User interface processing portions 401 are functionally provided corresponding to PLNs defined on the user network interface 307.

An ingress processing portion 401-1 of the user interface processing portion 401 is provided for each PLN. The ingress processing portion 401-1 executes a CIR control corresponding to a DLCI placed in each frame stored in the ingress processing buffer. When the ingress processing portion 401-1 has not discarded the frame as the result of the CIR control, it stores the address of the frame stored in the ingress processing buffer in an ingress processing queue corresponding to the PLN. In addition, the ingress processing portion 401-1 successively sends a DLCI of each frame stored in the ingress processing queue corresponding to the PLN and a memory address of a frame main portion (a hatched portion of FIG. 5(*a*)) to an ingress processing portion 403-1 of the ATM interface processing portion 403. At the same time, the ingress processing portion 401-1 accesses a frame relay switching table 402, retrieves a virtual path identifier and a virtual channel identifier (VPI/VCI) corresponding to the DLCI placed at a header portion of the frame main portion, and outputs the VPI/VCI to the ingress processing portion of the ATM interface processing portion 403.

Along with the above-described process, the ingress processing portion 401-1 executes a congestion control for the ingress processing queue corresponding to the PLN at predetermined sampling periods.

The ingress processing portion 403-1 of the ATM interface processing portion 403 calculates the length of the frame main portion stored in the memory address received from the ingress processing portion 401-1 of the user interface processing portion 401, and then sends the frame length, the memory address of the frame main portion, and the VPI/VCI received from the ingress processing portion 401-1 to a cell sending and receiving portion 405.

The cell sending and receiving portion 405 generates a protocol data unit (CPCS-PDU of FIG. 5(*c*)), equally divides the protocol data unit into new protocol data units (SAR-PDU of FIG. 5(*d*)), stores the divided protocol data units in respective payloads, successively generates ATM cells, and successively sends them to the ATM interface 308. Each protocol data unit includes a frame main portion stored in the memory address received from the ingress processing portion 403-1. In each ATM cell, one VPI/VCI received from the ingress processing portion 403-1 is placed in the header portion.

A record area that stores frames is used for an ingress processing buffer to which the frame sending and receiving portion 404 stores frames that are successively input from the user network interface 307.

On the other hand, the egress process is performed in the following manner.

The cell sending and receiving portion 405 assembles protocol data units (SAR-PDUs) of ATM cells that are successively received from the ATM interface 308, corresponding to each VPI/VCI placed in the header portions thereof so as to restore one protocol data unit (CPCS-PDU) that includes a frame main portion used for a frame relay communication in a memory (not shown). Thereafter, the cell sending and receiving portion 405 executes an error detecting process and a correcting process in a simple manner and restores the DLCI used for the frame relay communication and the frame main portion that includes user information. Next, the cell sending and receiving portion 405 sends the memory address and the VPI/VCI to the egress processing portion 403-2 of the ATM interface processing portion 403. The first and last ATM cells used for restoring one protocol data unit (CPCS-PDU) are identified corresponding to a field value of a payload type (PT) placed in the header portion of each ATM cell.

Thereafter, the egress processing portion 403-2 of the ATM interface processing portion 403 sends the memory address of the frame main portion received from the cell sending and receiving portion 405 to the egress processing portion 401-2 of the user interface processing portion 401. At this time, the egress processing portion 403-2 of the ATM interface processing portion 403 accesses the frame relay switching table 402 so as to retrieve a PLN and a DLCI corresponding to the VPI/VCI received from the cell sending and receiving portion 405. The egress processing portion 403-2 sends the retrieved DLCI to the egress processing portion 401-2 of the user interface processing portion 401 corresponding to the retrieved PLN.

The egress processing portion 401-2 of the user interface processing portion 401 places the DLCI received from the egress processing portion 403 in the header portion of the frame main portion stored at the memory address received from the egress processing portion 403-2 of the ATM interface processing portion 403. Thereafter, the egress processing portion 401-2 generates a frame used for the frame relay communication and then stores the memory address of the frame in the egress processing queue corresponding to the PLN. In addition, the egress processing portion 401-2 obtains memory addresses of the frames from the egress processing queue corresponding to the PLN one after the other and sends them to the frame sending and receiving portion 404.

The frame sending and receiving portion 404 successively sends the frames stored at the memory addresses received from the egress processing portion 401-2 of the user interface processing portion 401 corresponding to each PLN to the user network interface 307 at the time slot timing thereof.

FIG. 5 is a schematic diagram showing the relationship between data formats of a frame and an ATM cell that are converted in the ingress process or the egress process executed by the frame relay node unit 302.

A frame used for a frame relay communication has a data format corresponding to, for example, a high level data link control procedure (HDLC) as shown in FIG. 5(*a*). Referring to FIG. 5(*a*), a frame is composed of a flag sequence (Flag), a header portion (including a DLCI and so forth), an information portion that stores communication information of a subscriber, a frame check sequence (FCS), and a flag sequence (Flag).

A frame and an ATM cell are cross-converted by a layer function and an ATM layer function that are referred to as an ATM adaptation layer (AAL) of the frame relay node unit 302.

In other words, a service specific convergence sublayer (SSCS), that is one of the layer functions of the AAL function, cross-converts between a frame main portion that is composed of a header portion, and an information portion and an SSCS protocol data unit (SSCS-PDU). The SSCS function does not contain a meaningful process. The SSCS function only works as an interface between a frame main portion and a CPCS-PDU (that will be described next).

A common part convergence sublayer (CPCS) function, that is one of the layer functions of the AAL function, cross-converts between an SSCS-PDU having a format shown in FIG. 5(*b*) and a CPCS protocol data unit (CPCS-PDU) having a data format shown in FIG. 5(*c*). As shown in FIG. 5(*c*), in addition to the frame main portion, the CPCS-PDU includes an n-octet padding portion PAD ("n" will be described later), a two-octet reserved portion, a two-octet data length portion (Length), and a four-octet data check sequence (CRC 32) as well as the frame main portion. The octet length n of the padding portion (PAD) is designated so that the octet length of the CPCS-PDU becomes a multiple of 48 octets (48×N). The octet length of the entire CPCS-PDU is placed in the data length portion (Length). The data check sequence (CRC 32) is a CRC 32 code that is added for an error check of the entire CPCS-PDU.

In addition, a cell segmentation and reassembly (SAR) sub-layer function, that is one of the layer functions of the AAL function, cross-converts between a CPCS-PDU having a data format shown in FIG. 5(c) and an SAR protocol data unit (SAR-PDU) having a data format shown in FIG. 5(d). As shown in FIGS. 5(d) and 5(c), SAR-PDUs are obtained by dividing a CPCS-PDU by 48 octets.

An ATM layer function maps each SAR-PDU having a data format shown in FIG. 5(d) to a 48-octet payload for an ATM cell having a data format shown in FIG. 5(e). The length of the header portion of the ATM cell is five octets. Thus, each ATM cell has a length of 53 octets.

As described above, the CPCS function (including the SSCS function) of the layer function is performed by the ATM interface processing portion 403. The SAR sub layer function and the ATM layer function are performed by the cell sending and receiving portion 405.

CIR Packet Supplying Process

A supplying process for CB and EB values, that are the remaining data amount (referred to as CIR packets) that are transmitted in the normal transfer state and the burst transfer state, is performed in the CIR control executed by the frame relay node unit 302. Next, the supplying process will be described. The basic theory of this process was described in the section of "Related Art".

As described in "Related Art", since the conventional frame relay node unit executes the supplying process for CIR packets corresponding to each DLCI in each period ΔT as shown in FIG. 6A, the supplying process causes other processes to be delayed.

On the other hand, according to the preferred embodiment of the present invention, as shown in FIG. 6B, the period ΔT is further divided by, for example, 25. A DLCI is equally allocated to the resultant 25 time division timings (periods τ). The CIR packet supplying process is executed for the DLCI in each time division timing. Thus, in the preferred embodiment, since the CIR packet supplying process is separated into the time division timings in which ΔT is divided by 25, the concentration of the process can be prevented. The period of the CIR packet supplying process for one DLCI is ΔT, which is the same as that of the related art reference.

Figure 7:
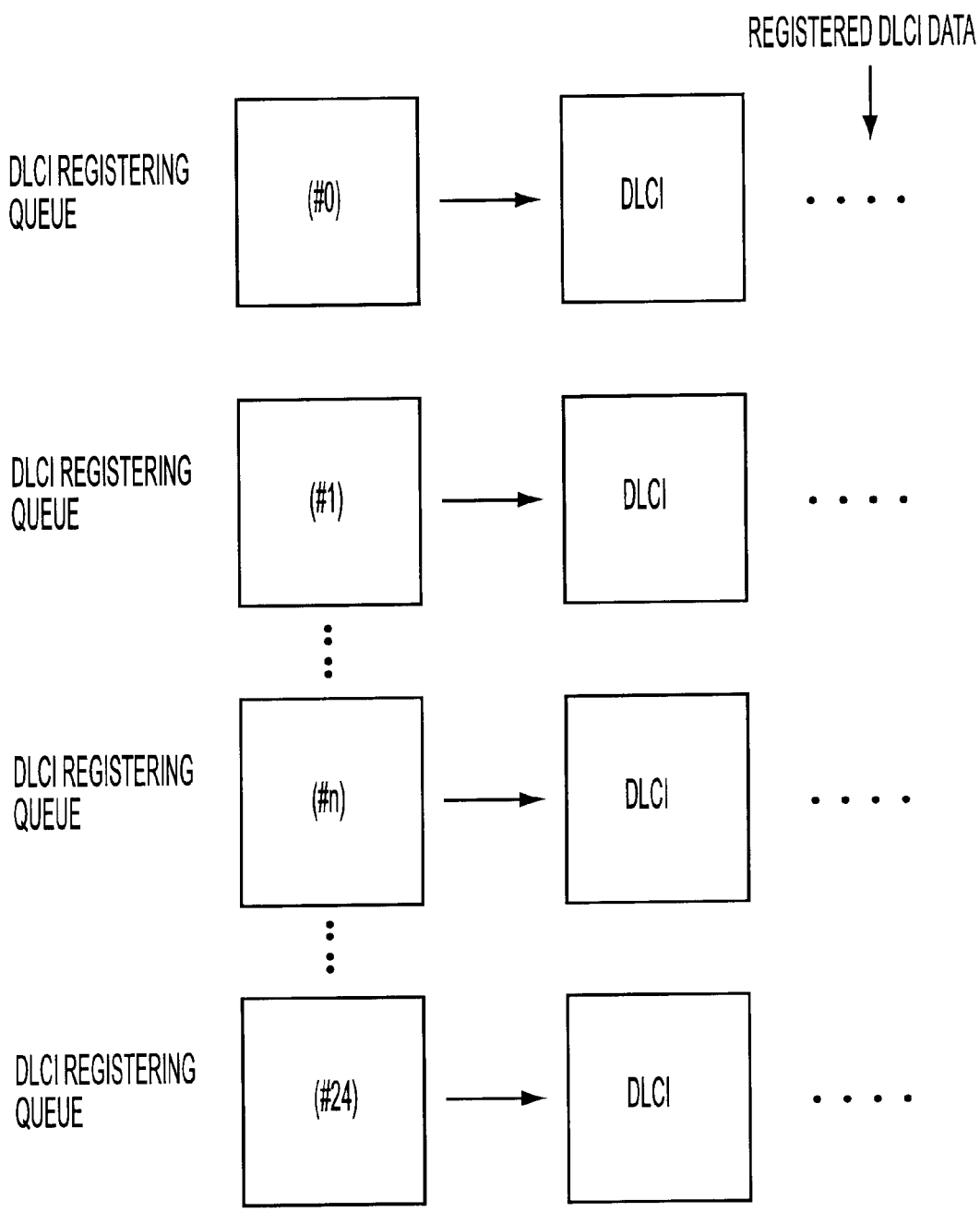
FIG. 7 is a conceptual schematic diagram showing DLCI registration.

FIG. 7 is a conceptual schematic diagram showing a DLCI registered at each time division timing. A memory (not shown) of the frame relay node unit 302 (see FIGS. 3 and 4) has DLCI registering queues #0 to #24. DLCIs registered by a control unit (not shown) are equally stored in respective queues.

Figure 8:
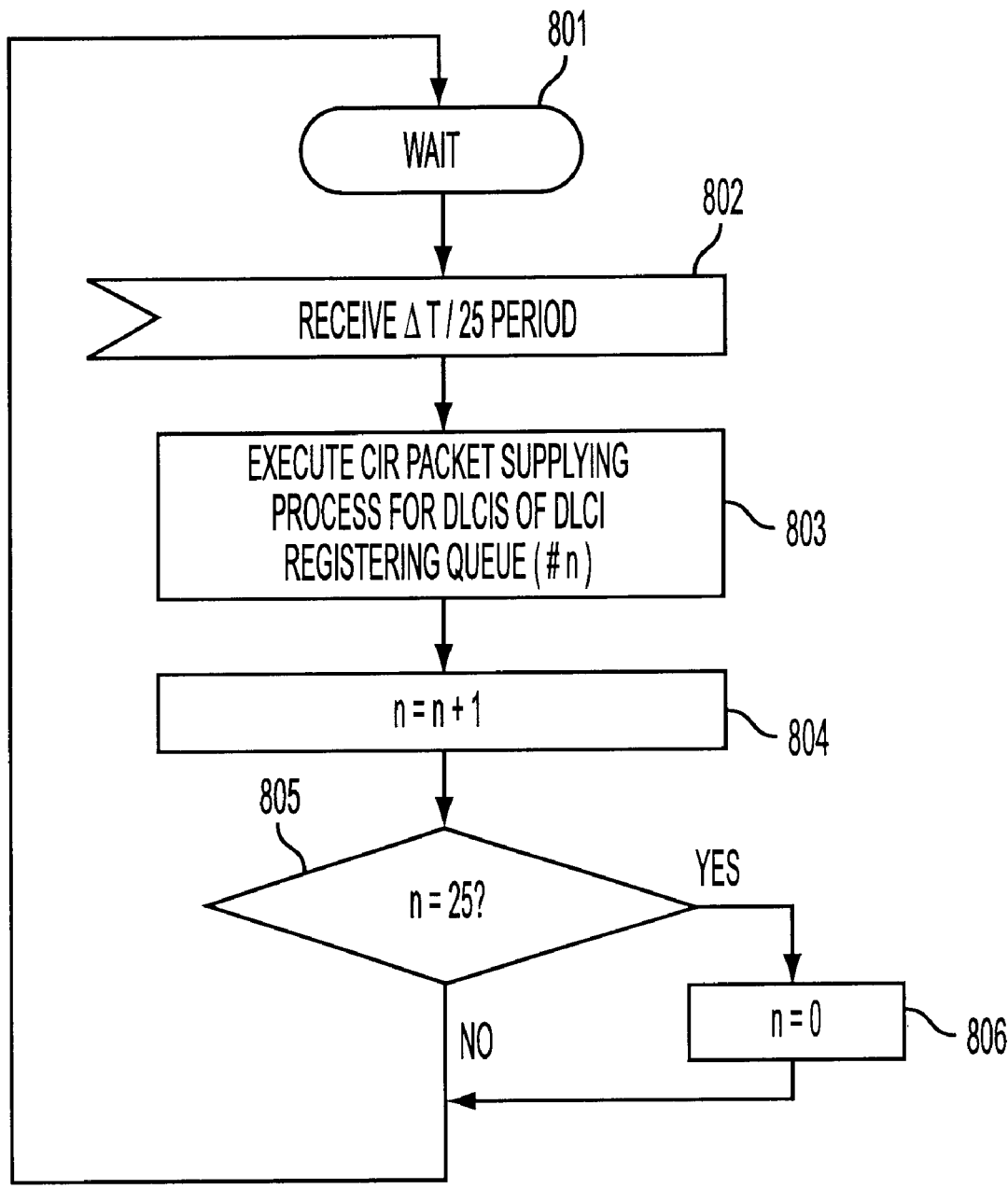
FIG. 8 is an operational flow chart showing a CIR packet supplying process according to a preferred embodiment of the present invention.

FIG. 8 is an operational flow chart showing a CIR packet supplying process using such DLCI registering queues. The ingress processing portion 401-1 of the user interface processing portion 401 of the frame relay node unit 302 shown in FIG. 4 executes the process of the operational flow chart shown in FIG. 8 as an interrupt process.

At step 801, an interrupt at each period ΔT/25 from a timer (not shown) is awaited.

At step 802, the timer interrupt at each period ΔT/25 is received. At step 803, the CIR packet supplying process is executed for each DLCI stored in the DLCI registering queue #n corresponding to the value of a variable n. In this process, the supply data amounts CIRΔT and EIRΔT corresponding to a DLCI stored in the buffer are added to the CB and EB values that are CIR packets stored in the buffer of a memory (not shown), respectively. As a result of the supplying process, when the CB and EB values exceed the values of the contracted amount BC in the normal transfer state and the contracted amount BE in the burst transfer state, the values CB and EB are set to BC and BE (that represent full states).

When the CIR packet supplying process for all DLCIs stored in the DLCI registering queue #n is finished, flow advances to step 804. At step 804, the value of the variable n is incremented by 1.

At step 805, it is determined whether or not the value of the variable n is 25. When the determined result at step 805 is YES, the value of the variable n is reset to 0. On the other hand, when the determined result at step 805 is NO, the flow returns to step 801. At step 801, the next timer interrupt at ΔT/25 periods is awaited.

As described above, since the CIR packet supplying process is divided into time division timings in which ΔT is divided by 25, the concentration of the process can be prevented. The present invention is not limited to the frame relay communication. Instead, if traffic data of each data link is periodically designated in another communication method, when the designating process is divided into a plurality of time division timings, the concentration of the process can be prevented.

DLCI Registering Queue Controlling Process

As described above, DLCIs registered by a control unit (not shown) should be equally stored in the DLCI registering queues #0 to #24 so as to equally distribute the process.

Figure 9:
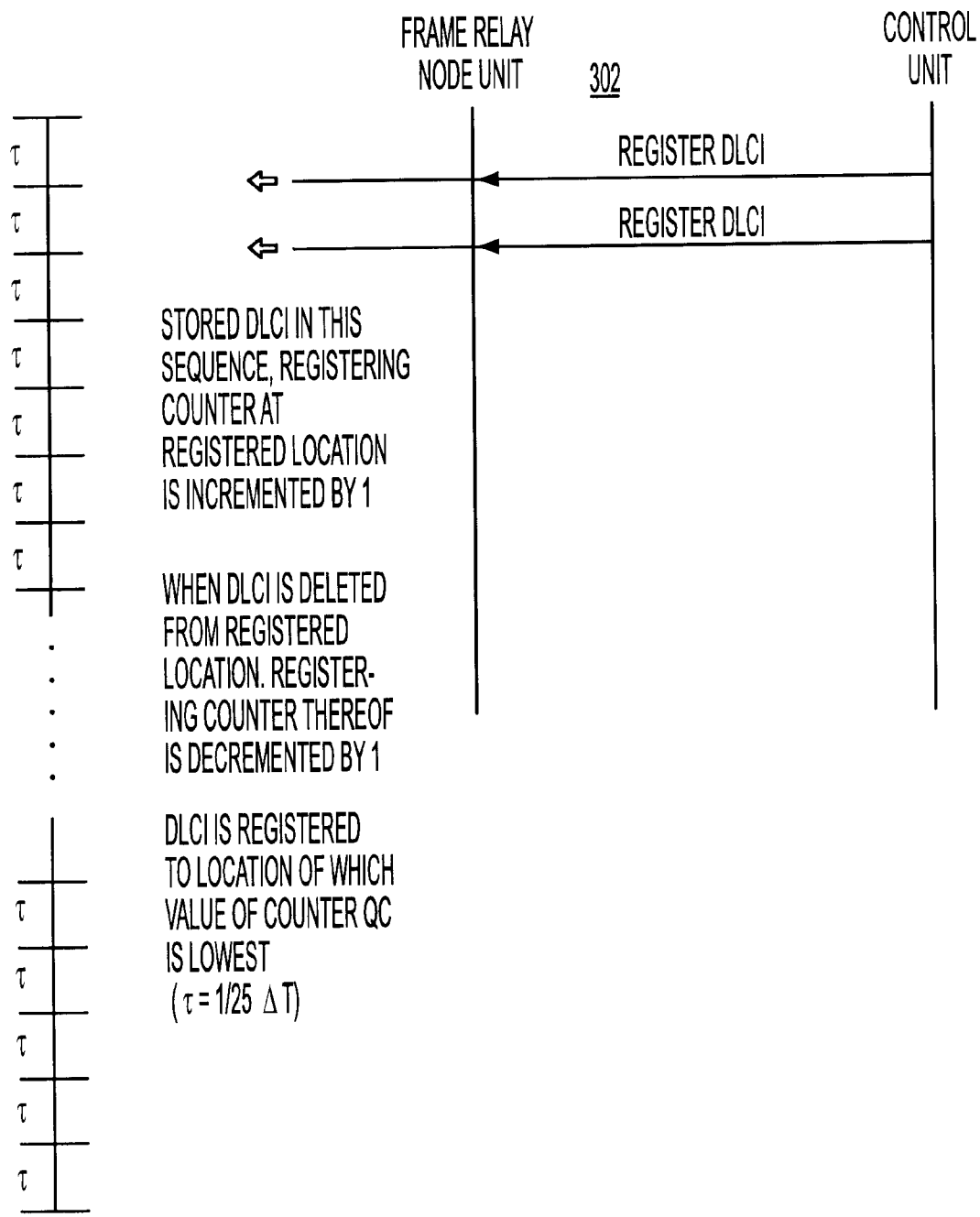
FIG. 9 is a schematic diagram for explaining a DLCI registering queue controlling process.

Thus, in the preferred embodiment of the present invention, as shown in FIG. 9, registering counters QC corresponding to respective DLCI registering queues are provided in the memory (not shown). Whenever a registered DLCI is stored in a queue, the value of the corresponding registering counter QC is incremented by 1. On the other hand, after a frame relay communication for a DLCI is finished, the DLCI is deleted from the queue and the value of the registering counter QC is decremented by 1.

Figure 10:
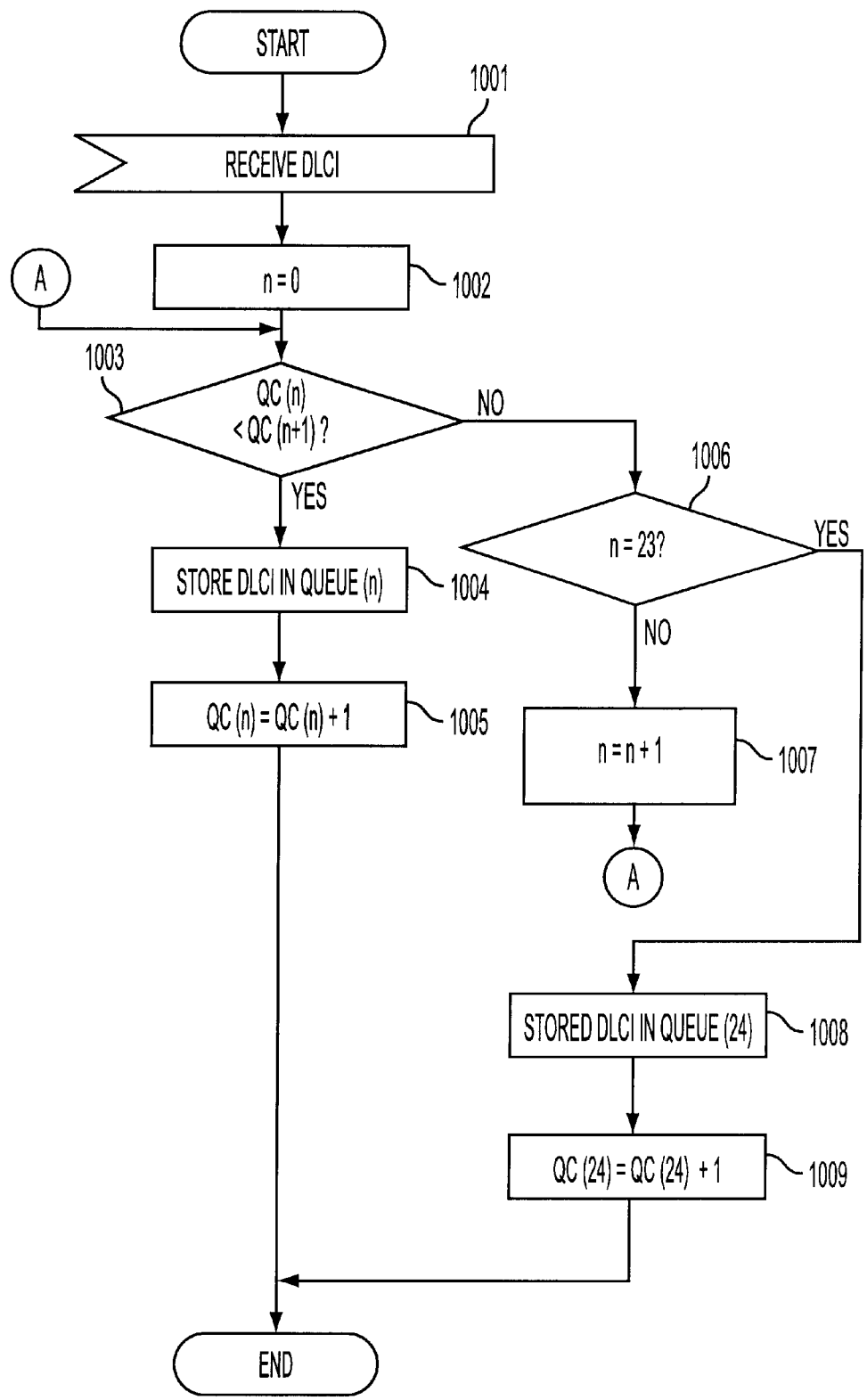
FIG. 10 is an operational flow chart showing a DLCI registering queue controlling process.

A DLCI is registered in a queue of which the value of the registering counter QC is lowest. FIG. 10 is an operational flow chart showing such a process. The ingress processing portion 401-1 of the user interface processing portion 401 of the frame relay node unit 302 executes the process of operational flow chart shown in FIG. 10.

At step 1001, when a registered DLCI is received from a control unit (not shown), the processes of steps 1002 to 1009 are executed.

In the process sequence, at step 1002, the value of the variable n that represents a DLCI registering queue is reset to 0. At step 1003, it is determined whether or not the value of a registering counter QC(n) corresponding to a DLCI registering queue is smaller than the value of a registering counter QC(n+1). When the determined result at step 1003 is NO, flow advances to step 1006. At step 1006, it is determined whether or not the value of the variable n is 23. If the determined result is NO, flow advances to step 1007. At step 1007, the value of the variable n is incremented by 1. The loop from step 1003 to step 1007 is repeated. The values of the registering counters QC(0) to QC(24) are initially reset to 0.

When the value of the registering counter QC(n) corresponding to the DLCI registering queue (n) is smaller than the value of the registering counter QC(n+1) of the later DLCI registering queue (n+1), and thereby the determined result at step 1003 is YES, the number of DLCIs stored in the DLCI registering queue (n) is smaller than the number of DLCIs stored in the DLCI registering queue (n+1). In this case, at step 1004, the registered DLCI received at step 1001 is stored in the DLCI registering queue (n). Thereafter, at step 1005, the value of the registering counter QC(n) corresponding to the DLCI registering queue (n) is incremented by 1 and the DLCI registering queue controlling process is finished.

On the other hand, in the loop of steps 1003→1006→1007→1003, when the determined result at step 1003 is NO, the value of the variable n is 23, thereby the determined result at step 1006 is YES, flow advances to step 1008. At step 1008, the registered DLCI received at step 1001 is stored in the last DLCI registering queue (24). Thereafter, at step 1009, the value of the registering counter QC corresponding to the last DLCI registering queue (24) is incremented by 1 and the DLCI registering queue controlling process is finished.

Although the above description relates to the registering method of DLCIs in the frame relay communication, the present invention is not limited thereto. Instead, when traffic data of each data link is equally allocated in each time division timing in another communication method, the process can be equally performed.

Improving Effectiveness of the CIR Packet Supplying Process

As described above, the CIR packet supplying process is executed for all DLCIs in time division timings into which $\Delta T$ is divided by 25 (see step 803 of FIG. 8). In this case, when the CB and EB values that are CIR packets corresponding to each DLCI are equal to BC and BE (representing full states) and the frame relay node unit 302 does not receive a frame corresponding to the DLCI, it is not necessary to execute the CIR packet supplying process for the DLCI. On the other hand, when the CB value or the EB value corresponding to the DLCI is not full or the frame relay node unit 302 receives a frame corresponding to the DLCI at $\Delta T$ after the full state, the CIR packet supplying process should be performed for the DLCI.

In the preferred embodiment, to finish the CIR packet supplying process in a short time and to perform another process, the following configuration is employed.

Figure 11:
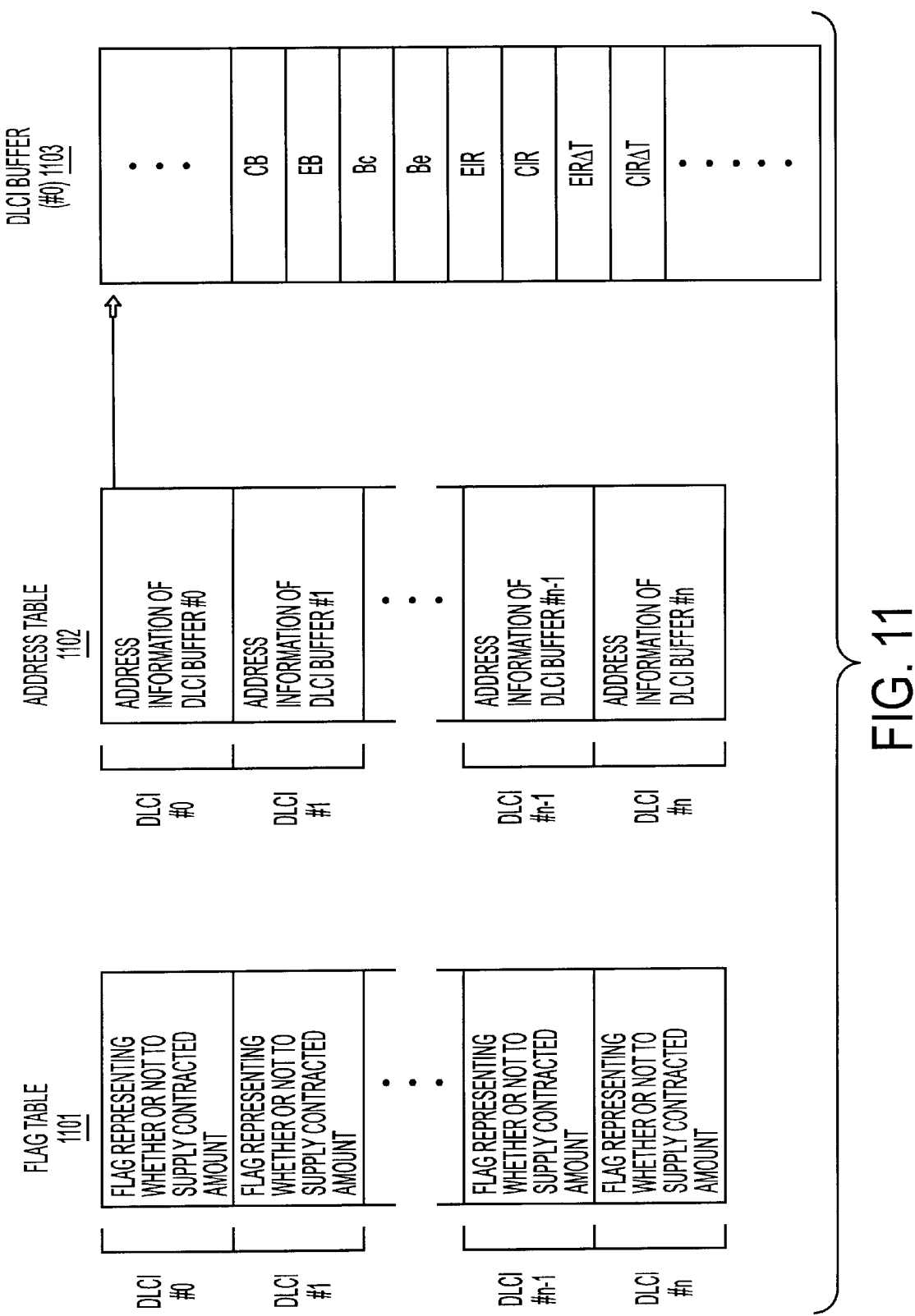
FIG. 11 is a schematic diagram showing a data structure in a CIR control.

As shown in FIG. 11, an address table 1102 that stores an address of a DLCI buffer 1103 that stores a CIR control parameter for each registered DLCI is provided in a memory (not shown).

In addition, a flag table 1101 that stores a flag representing whether or not to supply a BC or a BE that is a contracted amount of each DLCI to a CB or an EB of each DLCI is provided. This flag is referred to as a CIR supply flag.

When the CIR packet supplying process is executed for the DLCI at step 803 shown in FIG. 8, the CIR packet supply flag corresponding to the DLCI in the flag table 1101 is referenced. When the flag is ON, the CIR packet supplying process is executed. When the flag is OFF, the packet supplying process is not executed. In this manner, the efficiency of the CIR packet supplying process is improved.

Figure 12:
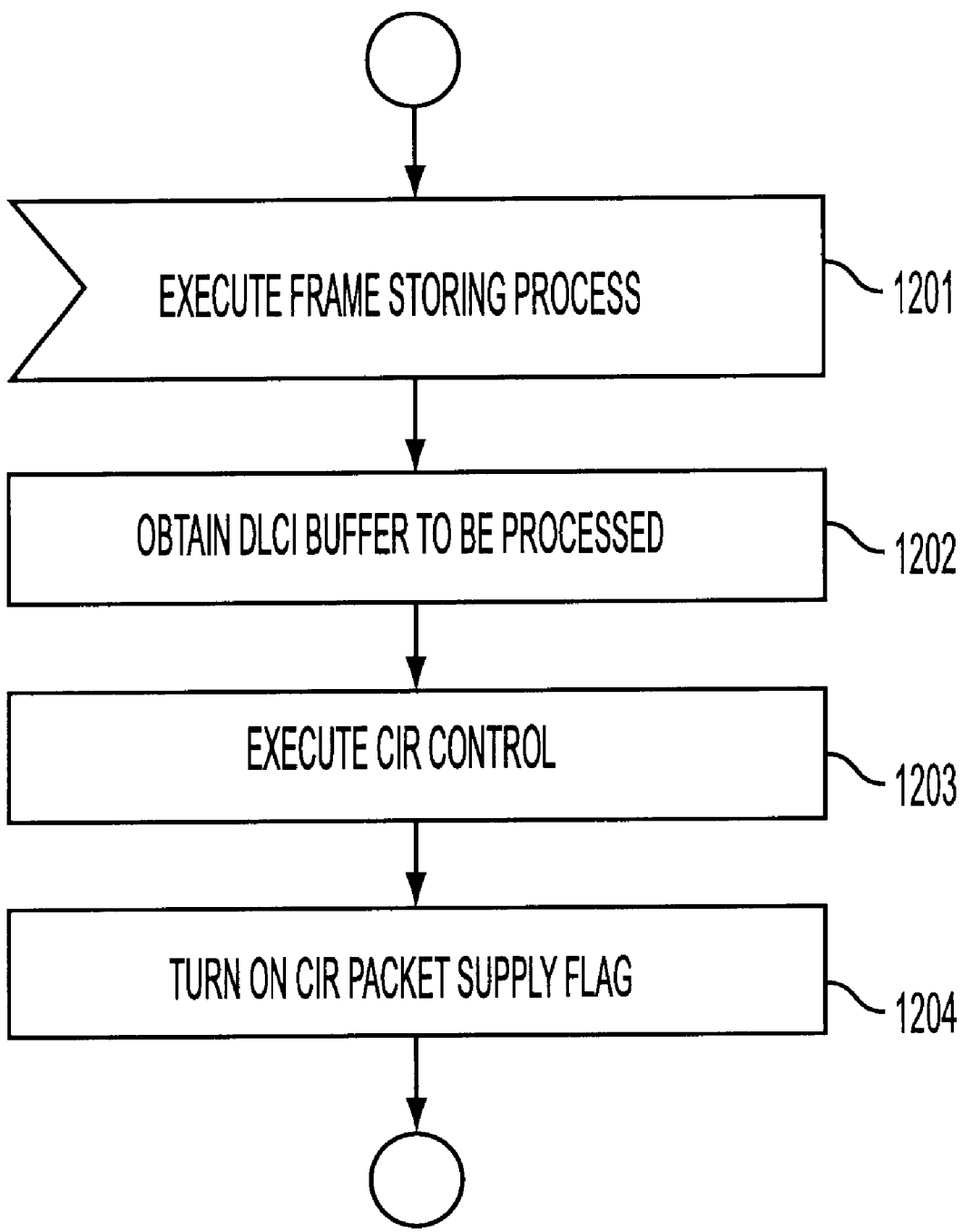
FIG. 12 is an operational flow chart showing a CIR packet supplying flag-on process.

FIG. 12 is an operational flow chart showing a process for turning on the CIR packet supply flag. The ingress processing portion 401-1 of the user interface processing portion 401 of the frame relay node unit 302 executes the process of the operational flow chart shown in FIG. 12 whenever the frame storing process at step 1201 is executed.

At step 1201, it is determined whether or not a frame has been received from the user network interface 307 and stored in an ingress processing buffer corresponding to the PLN in the memory (not shown). In addition, a frame storing process is executed. This process is executed in, for example, periods of 5 msec (this process will be described later with reference to FIG. 14).

At step 1202, an address in the address table 1102 shown in FIG. 11 is referenced corresponding to a DLCI (see FIG. 5) placed in the header portion of a frame read from the ingress processing buffer, so as to obtain a DLCI buffer 1103 corresponding to the DLCI.

At step 1203, a CIR control is executed with a CIR control parameter stored in the DLCI buffer 1103. As described in the section "Related Art", for each parameter in the DLCI buffer 1103, while the condition of $0<CB \leq BC$ is satisfied, the data amount of the received frame is subtracted from the CB value. On the other hand, when the conditions of $CB \leq 0$ and $0<EB \leq BE$ are satisfied in this order, the data amount of the frame is subtracted from the EB value.

When the CB value or the EB value is subtracted under the CIR control at step 1203, since the CIR packet supplying process should be executed after the next period $\Delta T$ elapses, the CIR packet supply flag is turned on at step 1204.

Figure 13:
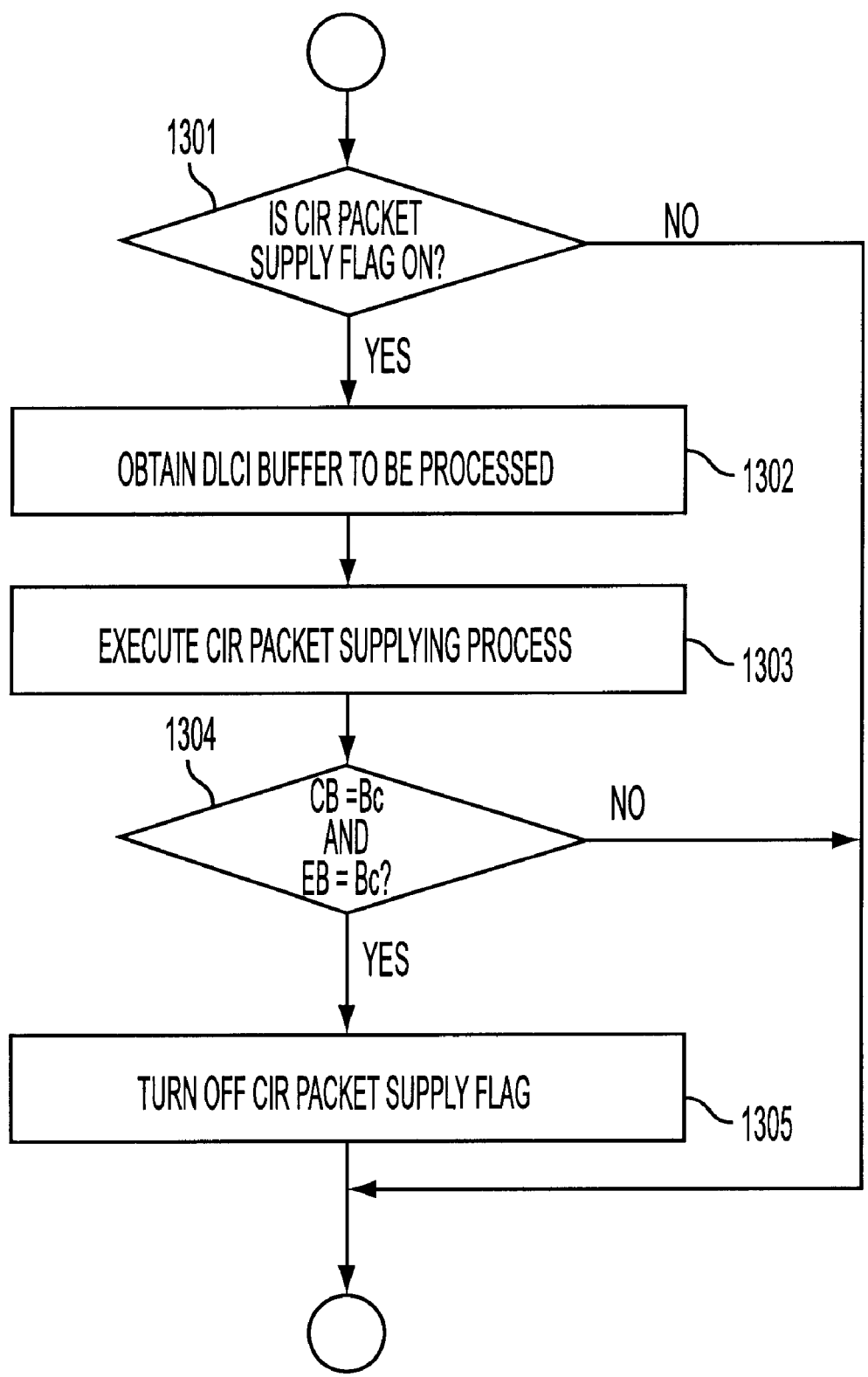
FIG. 13 is an operational flow chart showing a CIR packet supplying flag-off process.

FIG. 13 is an operational flow chart showing a process for turning off the CIR packet supply flag. The ingress processing portion 401-1 of the user interface processing portion 401 of the frame relay node unit 302 executes the process of the operational flow chart shown in FIG. 13 whenever the CIR packet supplying process for each DLCI is executed at step 803 shown in FIG. 8.

At step 1301, it is determined whether or not the CIR packet supply flag on the flag table 1101 corresponding to the DLCI to be processed is ON.

When the CIR packet supply flag corresponding to the DLCI to be processed is OFF and thereby the determined result at step 1301 is NO, since the CB and EB values that are CIR packets corresponding to the DLCI are the BC and BE values that represent full states, respectively, the process of the operational flow chart shown in FIG. 13 is finished. Thus, the CIR packet supplying process for this DLCI is not executed.

When the CIR packet supply flag corresponding to the DLCI to be processed is ON and thereby the determined result at step 1301 is YES, an address in the address table 1102 shown in FIG. 11 corresponding to the DLCI to be processed is referenced. Thus, the DLCI buffer 1103 corresponding to the DLCI is obtained.

At step 1303, the CIR packet supplying process for the CB or the EB stored in the obtained DLCI buffer 1103 is executed. This process has been described at step 803 shown in FIG. 8.

At step 1304, since the CIR packet supplying process at step 1303 has been executed, it is determined whether or not the CB value is equal to the BC value and whether or not the EB value is equal to the BE value (namely, whether or not the CB and the EB are in full states).

When both the CB and the EB are in full states and thereby the determined result at step 1304 is YES, flow advances to step 1305. At step 1305, the CIR packet supplying flag corresponding to the DLCI to be processed on the flag table 1101 shown in FIG. 11 is turned off. Thus, the process of the operational flow chart shown in FIG. 13 is finished.

When either the CB or the EB is not in full state and thereby the determined result at step 1304 is NO, the CIR packet supply flag corresponding to the DLCI to be processed on the flag table 1101 shown in FIG. 11 is still ON.

Although the above description relates to the CIR packet supplying process for each DLCI in the frame relay communication, the present invention is not limited thereto. Instead, when a traffic data designating-process is periodically performed for a plurality of data links in another communication method, the necessity of the traffic data designating process for these data links can be determined with reference to a predetermined flag so as to improve the efficiency of the traffic data designating process.

Frame Storing Process/frame Transferring Process

Major functions of the ingress processing portion 401-1 of the user interface processing portion 401 are a frame storing process and a frame transferring process for a received frame. If frames that cannot be processed by the frame relay node unit 302 are received from the user network interface 307, the ingress processing portion 401-1 executes a congestion control. However, even in the congestion state, a subscriber does not always stop sending frames. Thus, countermeasures against frames that cannot be processed by the frame relay node 302 should be considered.

In the preferred embodiment, the ingress processing portion 401-1 activates the frame storing process and the frame transferring process at periods of, for example, 5 msec so as to process frames in the periods.

Figure 14:
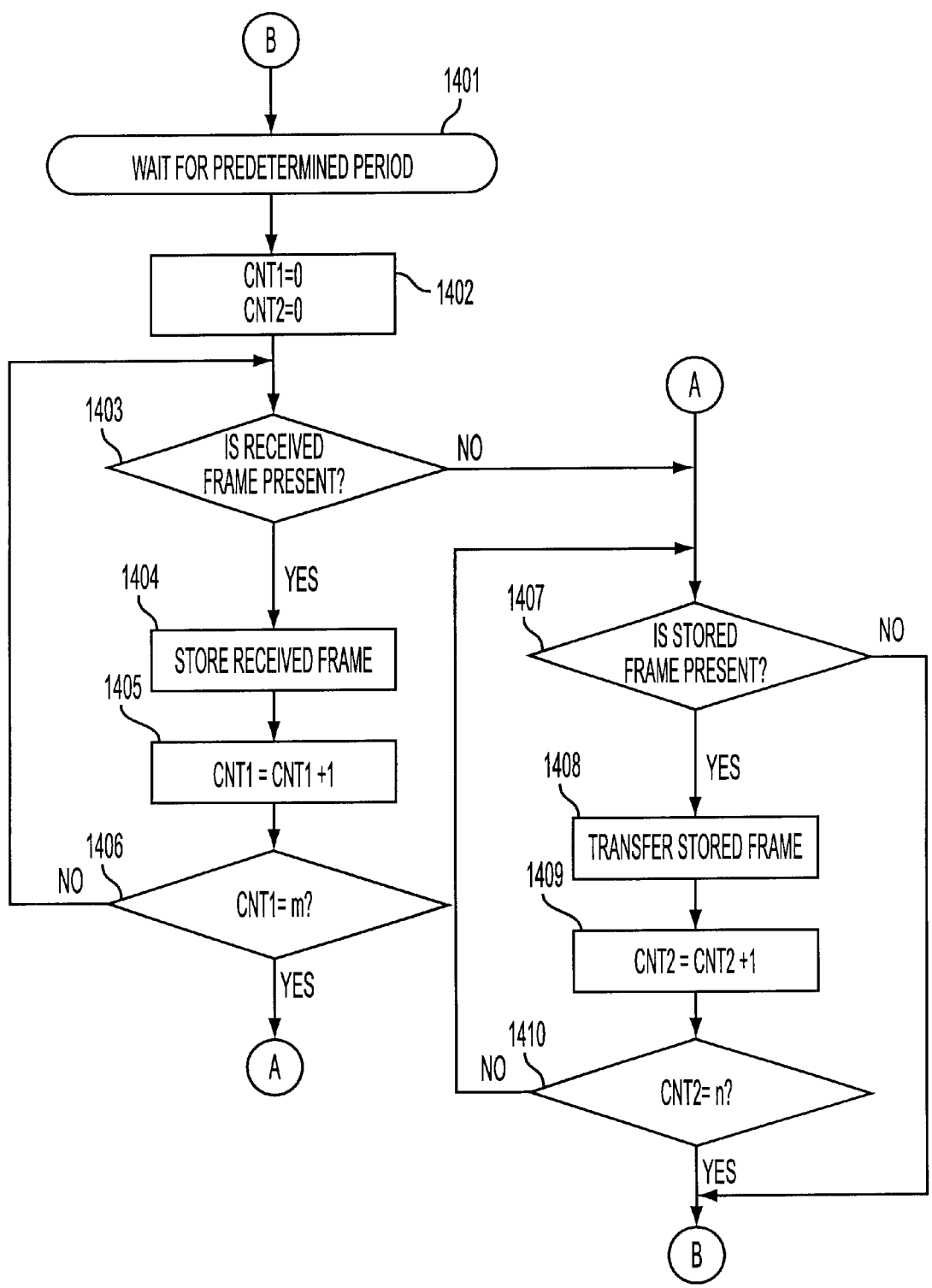
FIG. 14 is an operational flow chart showing a frame storing and transmitting process.

FIG. 14 is an operational flow chart showing such functions. The ingress processing portion 401-1 executes the process of the operational flow chart at periods of, for example, 5 msec.

At step 1401, an interrupt after a period of 5 msec is awaited.

When a period of 5 msec elapses due to an interrupt from a timer (not shown), flow advances to step 1402. At step 1402, the value of a counter CNT1 and the value of a counter CNT2 are reset to 0. The value of the counter CNT1 is a variable by which the number of received frames to be obtained is counted. The value of the counter CNT2 is a variable by which the number of received frames to be obtained is counted. The value of the counter CNT2 is a variable by which the number of obtained frames to be transferred is counted.

At step 1403, it is determined whether or not a frame has been received by the frame sending and receiving portion 404 in an ingress processing buffer corresponding to a PLN allocated to the ingress processing portion 401-1 that executes the process of the operational flow chart shown in FIG. 14. Each user interface processing portion 401 that includes the ingress processing portion 401-1 independently functions corresponding to the respective PLN.

When a frame has not been stored in the ingress processing buffer corresponding to the PLN and thereby the determined result at step 1403 is NO, the frame storing process is not executed. In this case, the frame transferring process of step 1407 is executed.

When a frame has been received in the ingress processing buffer corresponding to the PLN and thereby the determined result at step 1403 is YES, flow advances to step 1404. At step 1404, the frame is read from the ingress processing buffer. These processes accord with the process at step 1201 of the operational flow chart shown in FIG. 12. Thereafter, at step 1404, the CIR controlling process corresponding to steps 1202, 1203, and 1204 of the operational flow chart shown in FIG. 12 is executed. In the case that the CIR control at step 1202 is executed, when the conditions of $CB \leq 0$ and $EB \leq 0$ are satisfied in this order, as described in the section of "Related Art", since the data amount of a data link corresponding to a DLCI to be processed exceeds the contracted amount in the burst transfer state, the frame stored in the ingress processing buffer is not transferred to the network, but discarded. On the other hand, when the frame stored in the ingress processing buffer is not discarded, the memory address of the frame is stored in an ingress processing queue corresponding to a PLN allocated to the ingress processing portion 401-1 that executes the process of the operational flow chart shown in FIG. 14.

After the received frame storing process at step 1404, flow advances to step 1405. At step 1405, the value of the counter CNT1 that counts the number of received frames to be obtained is incremented by 1.

At step 1406, it is determined whether or not the value of the counter CNT1 is equal to a predetermined threshold value.

When the value of the counter CNT1 is less than the threshold value m and thereby the determined result at step 1406 is NO, flow returns to step 1403. At step 1403, a frame received in the ingress processing buffer corresponding to the PLN allocated to the ingress processing portion 401-1 is further retrieved and stored to the ingress processing queue.

When the value of the counter CNT1 is equal to the threshold value m and thereby the determined result at step 1406 is YES, it is determined that the number of received frames to be obtained exceeds the number of frames that can be processed. Thus, a further received frame is not obtained and the frame transferring process of step 1407 is executed.

At step 1407, it is determined whether or not a frame has been stored to an ingress processing queue corresponding to a PLN allocated to an ingress processing portion that executes the process of the operational flow chart shown in FIG. 14 (namely, whether or not the memory address of the frame has been stored).

When a frame has not been stored to the queue and thereby the determined result at step 1407 is NO, since there is no frame to be transferred, flow returns to step 1401. At step 1401, the interrupt after the next period of 5 msec is awaited.

When a frame has been stored to the queue and thereby the determined result at step 1407 is YES, flow advances to step 1408. At step 1408, the transferring process of the obtained frame is executed. In other words, a memory address of a frame is obtained from the queue. Thus, the DLCI of the frame stored in the memory address and the memory address of the frame main portion including the user information (the hatched portion of FIG. 5(*a*)) are sent to the ingress processing portion 403-1 of the ATM interface processing portion 403 shown in FIG. 4. At this point, since the frame relay switching table 402 of FIG. 4 is accessed, a PLN allocated to the ingress processing portion 401-1 that executes the process of the operational flow chart shown in FIG. 14 and VPI/VCI corresponding to the DLCI stored in the header portion of the frame are retrieved and the VPI/VCI is output to the ingress processing portion 403-1 of the ATM interface processing portion 403.

After the transferring process of the obtained frame is executed at step 1408, flow advances to step 1409. At step 1409, the value of the counter CNT2 that counts the number of obtained frames to be transferred is incremented by 1.

At step 1410, it is determined whether or not the value of the counter CNT2 is equal to a predetermined threshold value n.

When the value of the counter CNT2 is less than the threshold value n and thereby the determined result at step 1402 is NO, flow returns to step 1407. At step 1407, a frame stored to an ingress processing queue corresponding to a PLN allocated to the ingress processing portion 401-1 is further retrieved.

When the value of the counter CNT2 is equal to the threshold value n and thereby the determined result at step 1410 is YES, it is determined that the number of transferred frames exceeds the number of frames that can be processed by the frame transferring process. Thus, a further frame transferring process is not performed and flow returns to step 1401. At step 1401, the interrupt after the next period of 5 msec is awaited.

As described above, according to the preferred embodiment, the ingress process is periodically executed in periods of 5 msec. The number of frames stored in the ingress processing queue and the number of frames transferred from the ingress processing queue to the ingress processing portion 403-1 (see FIG. 4) of the ATM interface processing portion 403 are restricted. Thus, when frames that cannot be processed are instantaneously input from a particular PLN of the user network interface 307 to the frame relay node unit 302, the frames are temporarily stored in the ingress processing queue corresponding to the PLN. Thereafter, these frames are transferred from the queue to the ATM switching unit 303 (see FIG. 3). On the other hand, when frames that cannot be processed are continuously input from a particular PLN of the user network interface 307 to the frame relay node unit 302, since the length of the ingress processing queue corresponding to the PLN becomes long, a congestion control (that will be described later) is executed. With such a function, the ingress process for a frame received at a period of, for example, 5 msec can be finished so as to execute another process.

The present invention is not limited to the above-described embodiment for the ingress process. Instead, the present invention can be applied for an egress process. In this case, the egress process is also periodically executed. When the egress processing portion 401-2 of the user interface processing portion 401 processes frames received from the egress processing portion 403-2 of the ATM interface processing portion 403 and executes a process for storing the frames to an egress processing queue, the number of frames to be processed is restricted so as to be able to execute another process.

In addition, the present invention is not limited to the preferred embodiment for the frame relay communication method. Instead, when sending and receiving processes for communication information are periodically executed and the amount of the communication information to be processed is restricted, another process can be executed.

Relationship Between CIR Control and Congestion Control

As described above, in the storing process for received frames executed at step 1404 of FIG. 14, the CIR control is performed for each DLCI of a PLN. On the other hand, the congestion control is executed for all PLNs at a time. Thus, in the case that there are a plurality of data links (DLCIs) using one PLN, when one data link has a data amount that does not exceed a contracted data amount (BC and BE) and another data link has a data amount that exceeds the contracted data amount, if the congestion control is executed prior to the CIR control, a congestion state may take place due to the reception of a frame from a data link that does not exceed the contracted data amount.

Figure 15:
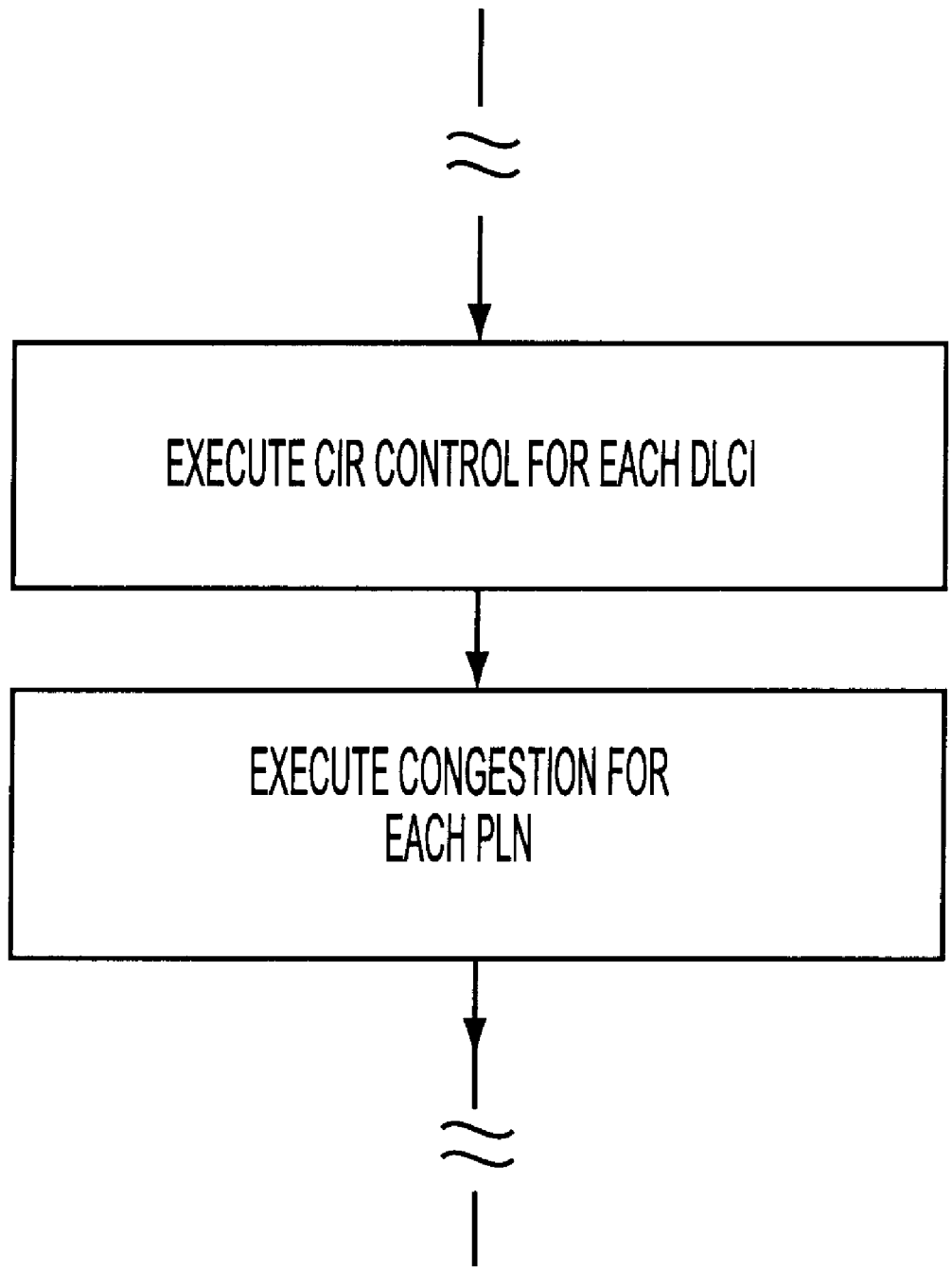
FIG. 15 is a schematic diagram showing the relationship between the CIR control and a congestion control.

To prevent such a problem, in the preferred embodiment, at step 1404 shown in FIG. 14, after the CIR control for a DLCI placed in a received frame is executed and the frame is stored to an ingress processing queue corresponding to a PLN to be processed, the congestion control is executed for the ingress processing queue at predetermined sampling periods. The relationship between the CIR control and the congestion control is shown in FIG. 15.

The above-described preferred embodiment defines the relationship of executions between the CIR control and the congestion control in the frame relay communication system. However, the present invention is not limited to such a relation. In another communication system, when traffic controls are executed for a plurality of logical links included in a physical link (namely, in a hierarchical traffic structure), since the traffic control is executed in the order of internal hierarchical traffic, congestion due to the communication of a traffic that complies with a predetermined rule can be prevented.

Congestion Control

As described above, at step 1404 shown in FIG. 14, the congestion control is executed for an ingress processing queue corresponding to a PLN allocated to the ingress processing portion 401-1.

The congestion control is executed so as to periodically monitor the length of an ingress processing queue and send the congestion state to the control unit (not shown) when the queue length exceeds a threshold value. The control unit can designate a predetermined threshold value to the ingress processing portion 401.

The queue length can be calculated corresponding to the following equation.

$$Y(s) = \alpha X(s) + (1-\alpha)Y(s-1) \tag{1}$$

where s is a sampling timing T; X(s) is a queue length for an ingress processing queue measured in the present sampling period; Y(s−1) is a calculated value of the queue length in the preceding sampling period; Y(s) is a calculated value of a queue length to be calculated in present sampling period; α is a value that satisfies the condition of $0 \leq \alpha \leq 1$ and a coefficient representing a weighting ratio between the measured value in the present sampling period and the measured value in the preceding sampling period. When the value of α is small, even if the measured value in each sampling period varies, the calculated value does not significantly vary. In contrast, when the value of α is large, the measured value in each sampling period largely affects the calculated value. In this calculating method, the degree of the violation of a congestion state message sent to the control unit can be controlled.

Figure 16A:
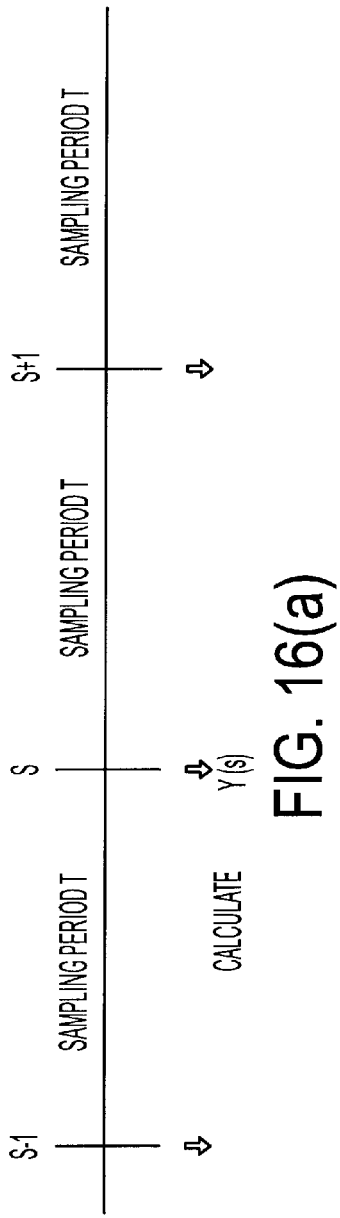
FIGS. 16A and 16B are schematic diagrams for explaining a congestion calculation.
Figure 16B:
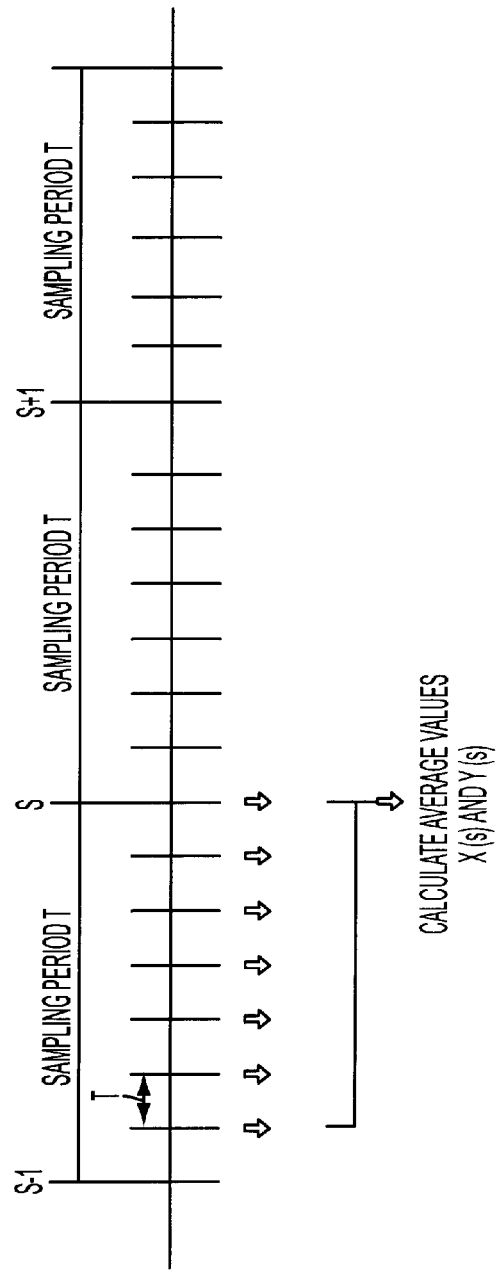

In the preferred embodiment, based on the above-described calculating method, in consideration of a long sampling period T for the congestion control, as shown in FIG. 16B, the queue length is sampled at sampling periods t into which the sampling period T is equally divided. As an average value of the sampling period T, X(s) used in the equation (1) is obtained.

Figure 17:
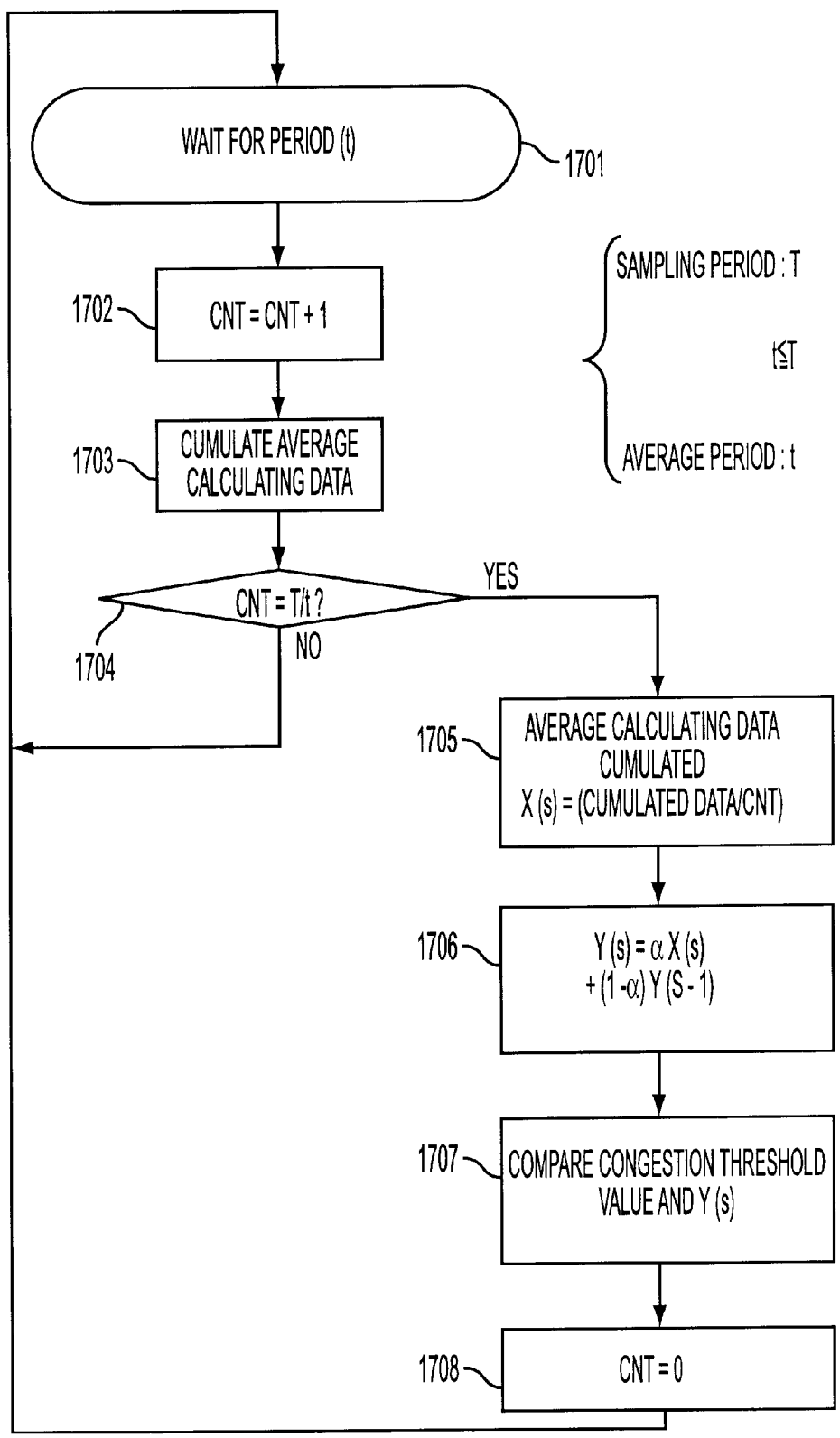
FIG. 17 is an operational flow chart showing a congestion calculating process according to a preferred embodiment.

FIG. 17 is an operational flow chart showing a congestion calculating process according to the preferred embodiment. The ingress processing portion 401-1 of the user interface processing portion 401 shown in FIG. 4 executes the process of the operational flow chart as an interrupt process in each sampling period t.

At step 1701, a period t is awaited. As shown in FIG. 16B, the period t is a sampling period into which the sampling period T is equally divided.

When a period t elapses due to an interrupt from a timer (not shown), at step 1702, the value of a counter CNT that is a variable for counting the number of the periods t is incremented by 1.

At step 1703, the queue length of an ingress processing queue corresponding to a PLN allocated to the ingress processing portion 401-1 that executes the process of the operational flow chart shown in FIG. 17 is measured at the present timing. The measured values are cumulated to be average value data stored in a memory (not shown).

At step 1704, it is determined whether or not the value of the counter CNT is equal to the value corresponding to T/t.

When the determined result at step 1704 is NO, since average calculating data has not been cumulated for the sampling period T, flow returns to step 1701.

In the loop from step 1701 to step 1704, when the value of the counter CNT is equal to the value corresponding to T/t and thereby the determined result at step 1704 is YES, flow advances to step 1705. At step 1705, the average value of the queue length is calculated corresponding to the average calculating data cumulated for the sampling period T by the following equation.

$$X(s) = \text{average calculating data cumulated}/CNT \quad (2)$$

At step 1706, with X(s) calculated corresponding to the equation (2), the calculated value Y(s) of the queue length in the present sampling period s is obtained corresponding to the equation (1).

At step 1707, a congestion threshold value designated by a control unit (not shown) and the value Y(s) of the queue length calculated at step 1706 are compared. When the congestion state varies, a congestion state message corresponding to the compared result is sent to the control unit (not shown).

At step 1708, the value of the counter CNT is reset to 0. Thereafter, flow returns to step 1701.

In the above-described preferred embodiment of the congestion controlling method for the frame relay communication method, the congestion information is smoothed over a plurality of sampling periods. In addition, the congestion information is averaged in shorter sampling periods than each sampling period. However, the present invention is not limited to such methods. Instead, the present invention can be applied to congestion controlling methods of other communication methods in the same manner.

Allocating Ingress Processing Buffers Corresponding to a Number of Time Slots for each PLN As described above, the frame sending and receiving portion 404 shown in FIG. 4 successively receives frames from the user network interface 307 and stores the received frames in ingress processing buffers of a memory (not shown) at time slot timings corresponding to PLNs. In this case, the storage capacity of the memory of the frame relay node unit 302 is limited. The allocation of ingress processing buffers to the PLNs is an important problem to solve.

In the frame relay communication method according to the preferred embodiment, one PLN is formed by a combination of at least one time slot with a transfer bit rate of 64kbps on the user network interface 307 that is a PCM digital line with a transfer bit rate of 1.5 Mbps and of which, for example, 24 time slots are multiplexed. With the PLNs, the frame relay communication is performed. Thus, the frame relay node unit 302 processes frames sent to subscribers with PLNs having many time slots and frames sent to subscribers with PLNs having few time slots.

To solve such a problem, according to the preferred embodiment, ingress processing buffers are allocated so that the frame relay control is performed corresponding to the number of time slots for each PLN.

Figure 18:
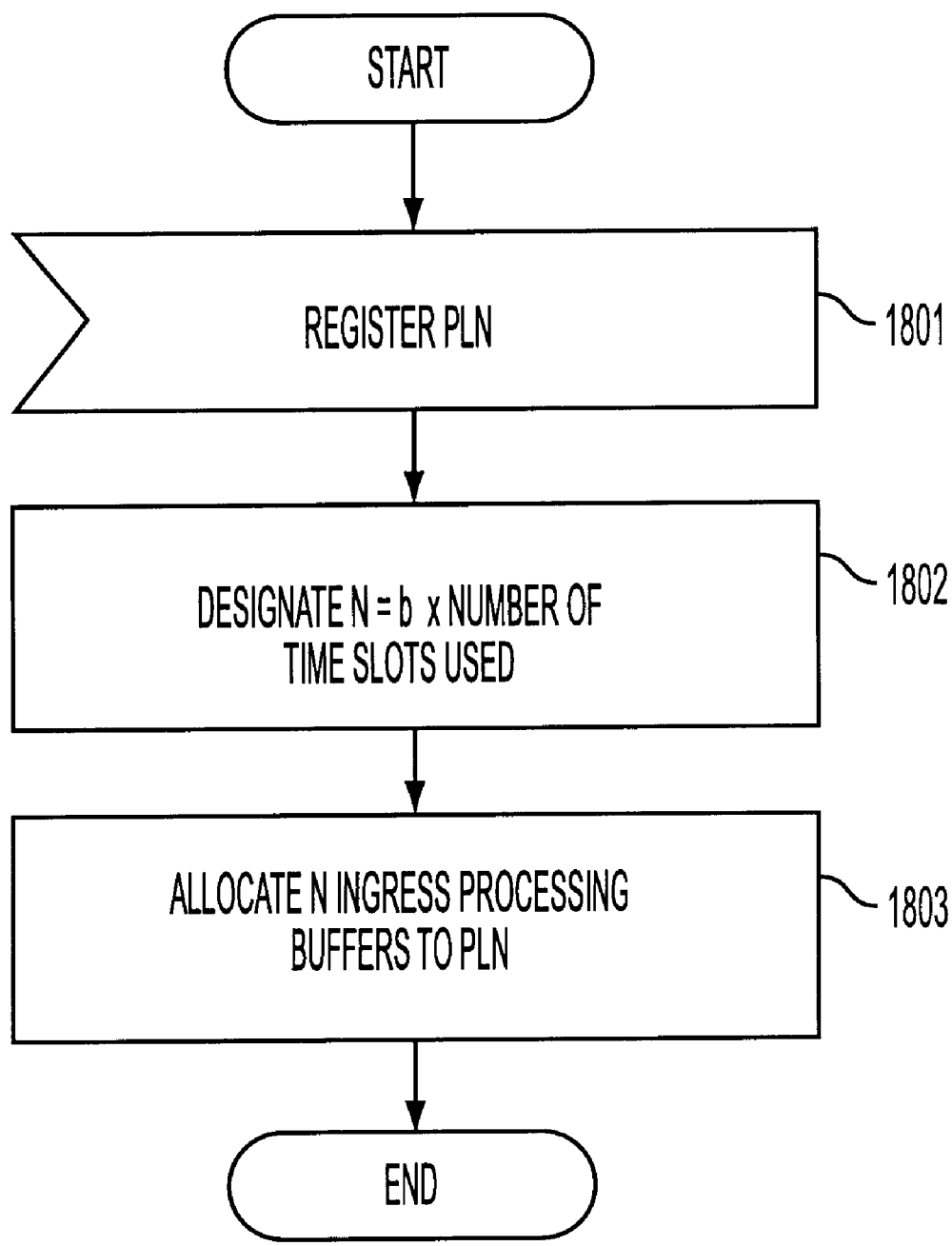
FIG. 18 is an operational flow chart showing an allocating process for an ingress processing buffer for each PLN corresponding to the number of time slots thereof.

FIG. 18 is an operational flow chart showing an allocating process for ingress processing buffers corresponding to time slots for each PLN. The ingress processing portion 401-1 of the user interface processing portion 401 of the frame relay node unit 302 shown in FIG. 4 executes the process of the operational flow chart shown in FIG. 18.

At step 1801, a notification of the registration of a PLN is received from a control unit (not shown). The notification includes an identifier of the registered PLN and the number of time slots used by the PLN.

At step 1802, the number of ingress processing buffers N allocated to the notified PLN is calculated. Now assume that the total number of the ingress processing buffers of the buffer memory in the frame relay node unit 302 is B. Each ingress processing buffer has the storage capacity of one frame. The B ingress processing buffers are equally divided into a number (for example, 24) corresponding to the number of time slots of the user network interface 307. Thus, b ingress processing buffers can be allocated to one time slot of the user network interface 307. The number of ingress processing buffers is given by the following equation.

$$b = B/24 \quad (3)$$

Thereafter, the number of ingress processing buffers, N, allocated to the notified PLN is calculated by the following equation (4) corresponding to the number of ingress processing buffers, b, per time slot calculated by the equation (3) and the number of time slots.

$$N = b \times \text{number of time slots} \quad (4)$$

At step 1803, ingress processing buffers corresponding to the value N calculated by the equation (4) are allocated corresponding to the identifier of the PLN. Thereafter, the process of the operational flow chart is finished.

Now, for example, assume that the number of ingress processing buffers of the buffer memory in the frame relay node unit 302 is 240 and the number of time slots on the user network interface 307 is 24. Thus, corresponding to the equation (3), since b=240/24=10, 10 ingress processing buffers can be allocated for one time slot on the user network interface 307. Consequently, corresponding to the equation (4), when a PLN uses two time slots, since N=10×2=20, 20 ingress processing buffers are allocated to the PLN. When another PLN uses 22 time slots, since N=10×22=220, 220 ingress processing buffers are allocated to the PLN.

As described above, since ingress processing buffers are allocated to a PLN corresponding to the capacity of time slots thereof, the congestion control can be properly executed corresponding to the number of time slots of a PLN.

In other words, the threshold value of the length of the ingress processing queue corresponding to each PLN under the congestion control is designated to a value corresponding to a predetermined percentage value of the capacity of an ingress processing buffer, N (in the equation (4)), corresponding to the PLN. Thus, frames corresponding to time slots for each PLN can be sent to the frame network.

Although the above-described preferred embodiment relates to the allocating method for ingress processing buffers, the present invention is not limited thereto. Instead, the present invention can be applied for a buffer allocating method for the egress process.

In addition, although the above-described preferred embodiment relates to the buffer allocating method corresponding to the number of time slots of each PLN, the present invention is not limited thereto. Instead, the present invention can be applied for a buffer allocating method corresponding to a transmission band of a data link in another communication method.

Frame Storing Process and Frame Transferring Process Having Control Construction Corresponding to the Number of Time Slots for each PLN and Control Configuration using a Bit Map As described with reference to FIG. 14, the ingress processing portion 401-1 periodically activates the frame storing process for sending a frame from an ingress processing buffer to an ingress processing queue and the frame transferring process for transferring the frame from the ingress processing queue to the ingress processing portion 403-1 in periods of, for example, 5 msec. The ingress processing portion 401-1 performs the frame storing process and the frame transferring process for frames that can be processed in the period of 5 msec. On the other hand, as described above, time slots (namely, ingress processing buffers corresponding to the capacity of the transmission path) are allocated to each PLN.

In the preferred embodiment (see an operational flow chart shown in FIGS. 20 to 22), an ingress processing portion of each of a plurality of user interface processing portions 401 corresponding to each PLN periodically activates the frame storing process and the frame transferring process only for frames of all the PLNs that can be processed in the period. In addition, the ingress processing portion 401-1 executes the frame storing process and the frame transferring process so that the number of frames corresponding to each PLN accords with the number of ingress processing buffers, N (see equation (4)).

Since one ingress processing portion corresponding to one PLN executes the process of the operational flow chart shown in FIG. 14, the number of frames, m, that can be processed in the period of 5 msec is the number of frames that can be processed for each PLN (at step 1406). On the other hand, in the following preferred embodiment (see an operational flow chart of FIGS. 20 to 22), since one ingress processing portion 401-1 processes frames of all PLNs, the number of frames that can be processed in the period of 5 msec is defined as the number of frames that can be processed of all the PLNs.

In practice, it is assumed that the number of frames for all PLNs that can be stored from an ingress processing buffer to an ingress processing queue in the period of 5 msec is equal to the total number of ingress processing buffers, B, in the memory of the frame relay node unit 302. In this case, when the number of frames that can be stored from an ingress processing buffer corresponding to each PLN to a corresponding ingress processing queue in the period of 5 msec is equal to the number of ingress processing buffers, N (equation (4)), allocated to the PLN, all frames in the ingress processing buffer for each PLN can be stored in the corresponding ingress processing queue. In practice, in consideration of characteristics of the traffic, the number of frames corresponding to all the PLNs that can be stored from the ingress processing buffer to the ingress processing queue is much smaller than the total number of the ingress processing queues, B, of the memory in the frame relay node unit 302. Generally, with the above-described assumption, the following relation is satisfied.

$$B:k=N:Np \qquad (5)$$

where k is the number of frames of all PLNs that can be stored from an ingress processing buffer to an ingress processing queue in a period of 5 msec; and Np is the number of frames that can be read from the ingress processing buffer to the corresponding processing queue.

Thus, the value NP corresponding to each PLN can be calculated by the following equation.

$$NP=k \times N/B$$

In other words, the value NP corresponding to each PLN can be calculated by multiplying the ratio N/B of the number of bytes, N, allocated to each PLN to the total number of buffers, B, by the number of frames, k, that can be processed corresponding to all PLNs in a period of 5 msec.

For example, when the value of k is 24 that is equal to the number of time slots of the user network interface 307, using the equation (6), NP can be calculated as follows.

$$NP=N \times 24/B \qquad (7)$$

When the equations (3) and (4) are substituted into the equation (7), the following equation is obtained.

$$Np = b \times \text{number of time slots used} / b$$
$$= \text{number of time slots used}$$

In other words, when the value of k is equal to 24 that is the number of time slots of the user network interface 307, the number of frames, NP, corresponding to each PLN that can be read in the period is equal to the number of time slots used for each PLN.

Figure 20:
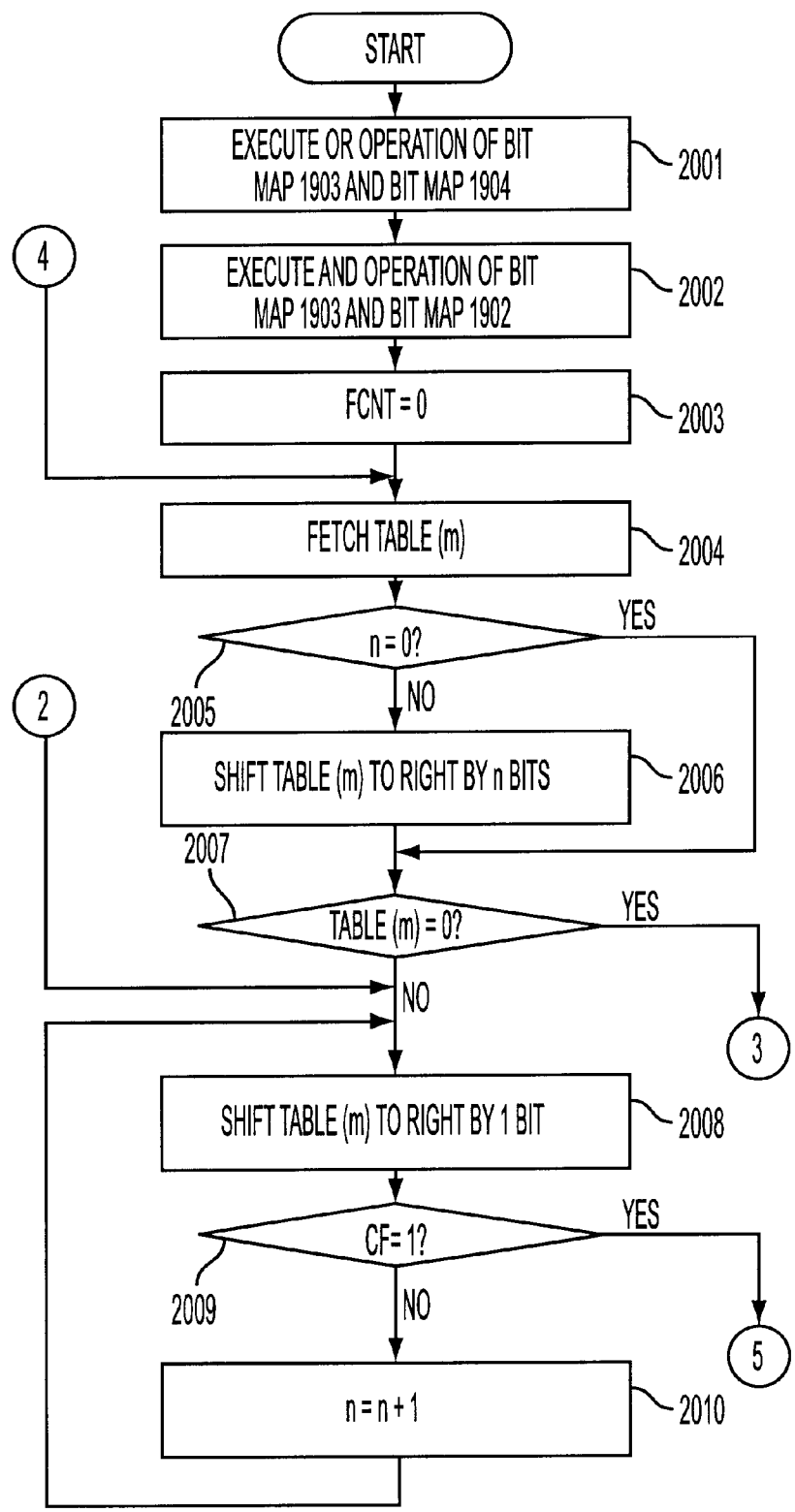
FIG. 20 is an operational flow chart showing a frame storing process having a control construction corresponding to the number of time slots of a PLN and a control construction using a bit map (No. 1)
Figure 21:
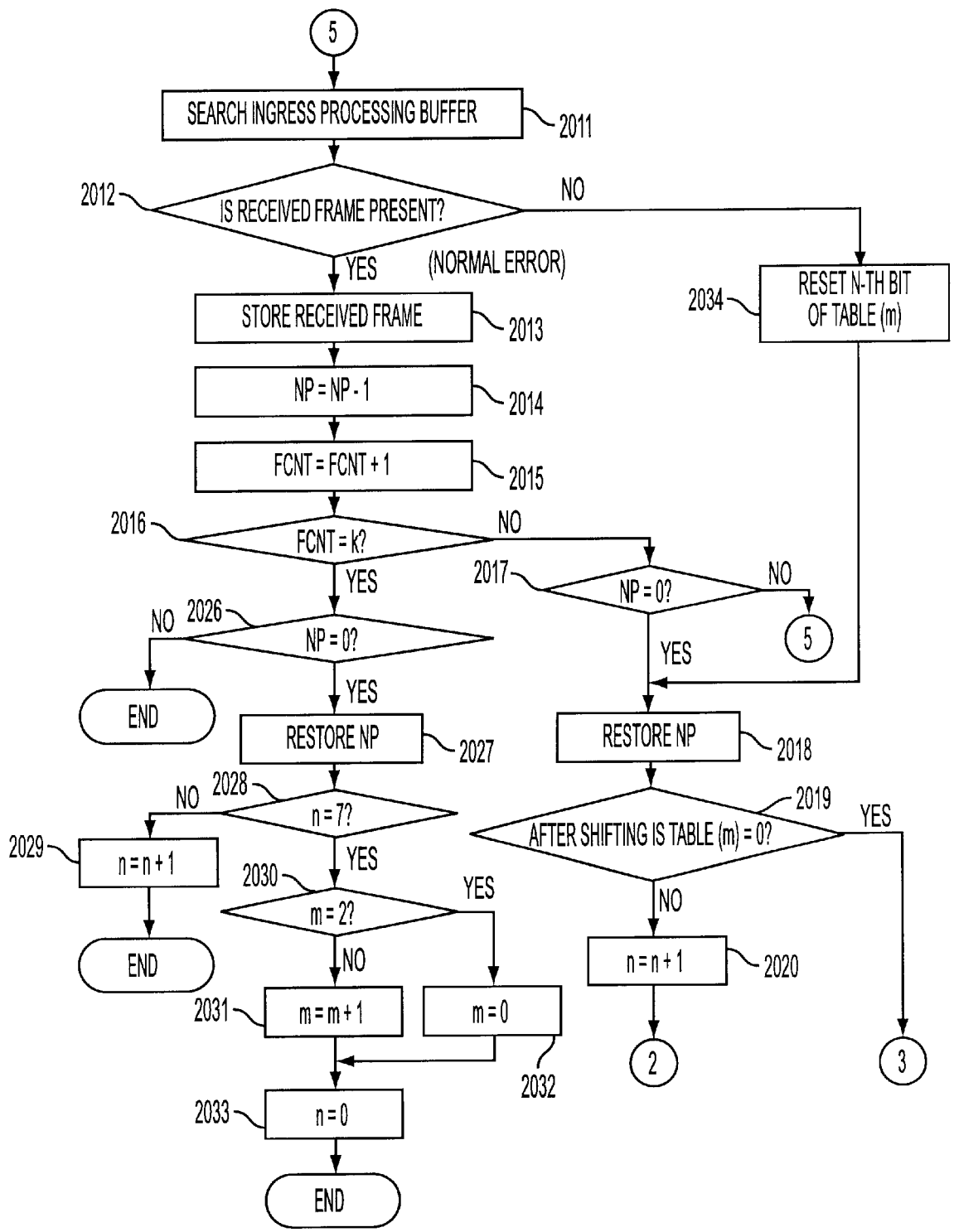
FIG. 21 is an operational flow chart showing a frame storing process having a control configuration corresponding to the number of time slots of a PLN and a control construction using a bit map (No. 2)
Figure 22:
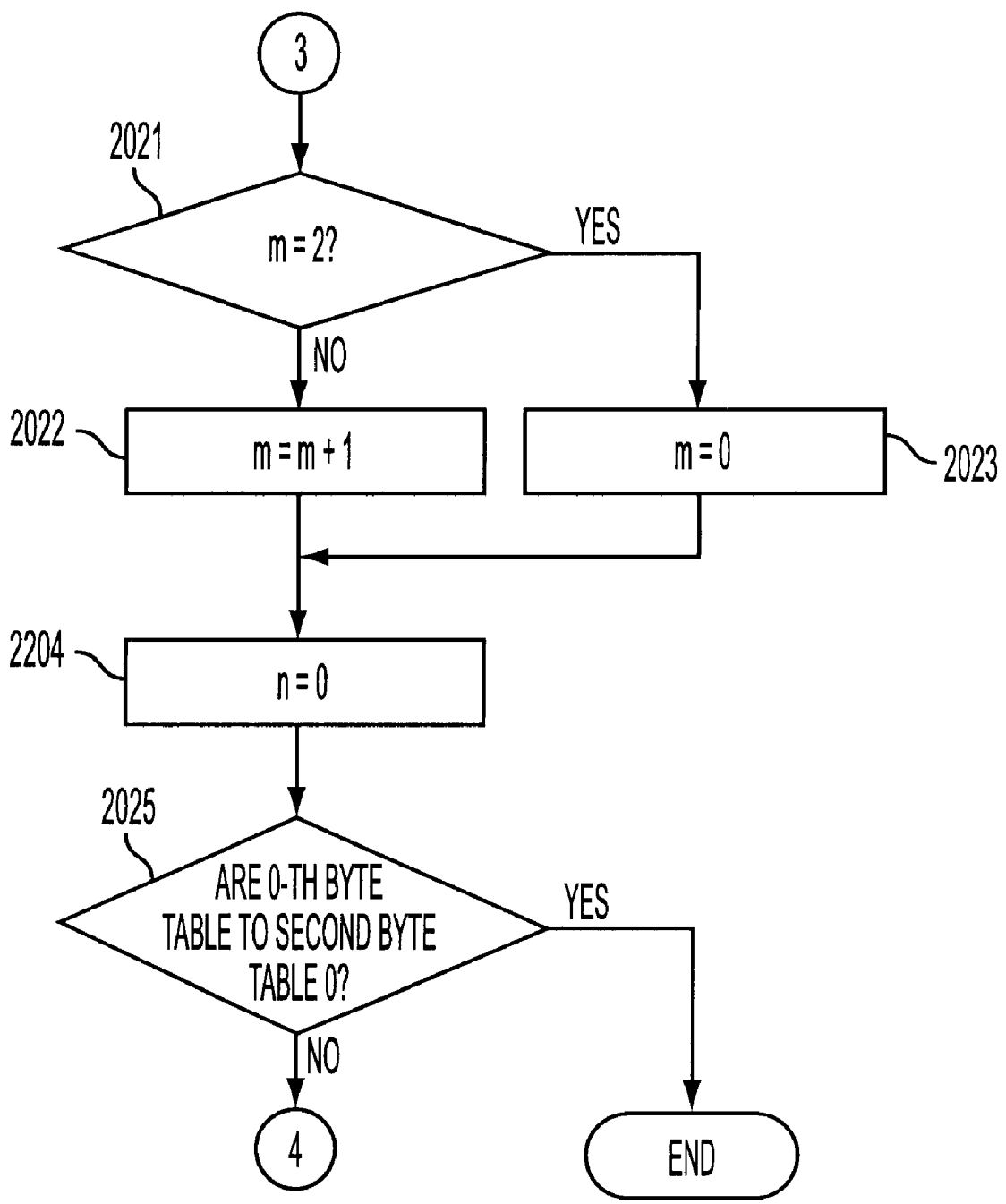
FIG. 22 is an operational flow chart showing a frame storing process having a control construction corresponding to the number of time slots of a PLN and a control construction using a bit map (No. 3)

The above-described theory is practically applied for the frame storing process of the operational flow chart shown in FIGS. 20 to 22.

The above-described theory can be applied for not only the process for storing frames of each PLN from an ingress processing buffer to a corresponding ingress process queue in a period of 5 msec, but also the process for transferring the frames from the ingress processing queue to the ingress processing portion 403-1 of the ATM interface processing portion 403.

When one ingress processing portion 401-1 processes frames of all PLNs, whenever the frame storing process is executed, it is necessary to determine whether or not a frame is received in an ingress processing buffer corresponding to each PLN, whether or not a frame can be received on each PLN, and whether or not frames received in an ingress processing buffer corresponding to each PLN have been stored in a corresponding ingress processing queue in the preceding period of 5 msec.

To determine whether or not a frame has been received in an ingress processing buffer corresponding to each PLN, whenever an interrupt that represents the reception of the frame takes place, the egress processing buffer corresponding to the PLN should be accessed. In addition, to determine whether or not a frame received in an ingress processing buffer corresponding to each PLN has been stored in an ingress processing queue corresponding to the PLN in the preceding period of 5 msec, the ingress processing buffer should be accessed. Moreover, to determine whether or not a frame can be received on each channel, a control unit (not shown) should be accessed. However, if such accesses are attempted, the frame storing process of frames is delayed. Thus, the process performance of the frame relay node unit 302 will deteriorate. In particular, if a buffer is accessed whenever a reception interrupt takes place, the process will get significantly delayed.

Figure 19:
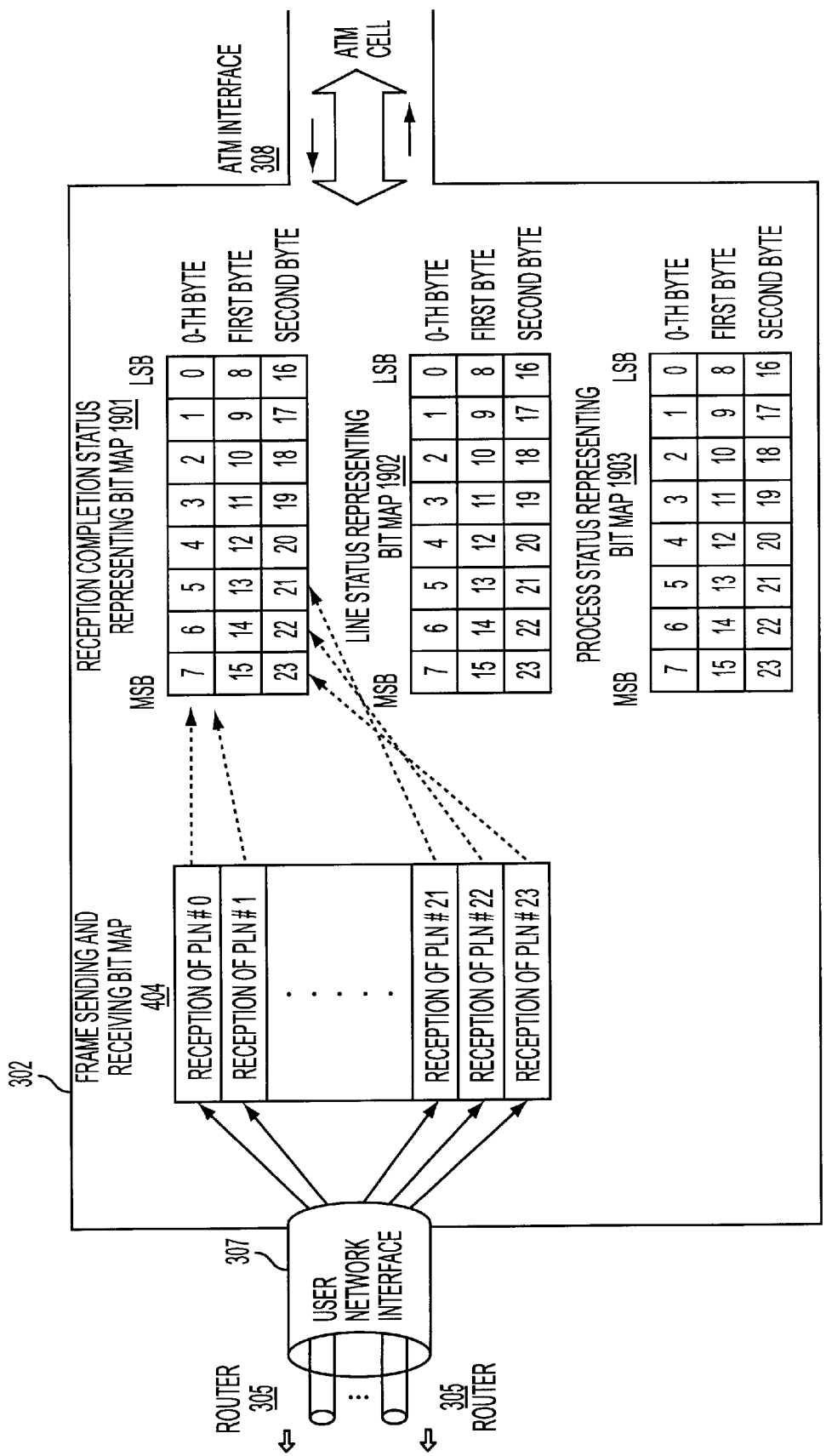
FIG. 19 is a schematic diagram for explaining a bit map.

In the following preferred embodiment (see an operational flow chart shown in FIGS. 20 to 22), three bit maps as shown in FIG. 19 are used so as to increase the speed of the process.

In FIG. 19, three bit maps 1901, 1902, and 1903 are stored in a memory (not shown) of the frame relay node unit 302. Each of the bit maps 1901, 1902, and 1903 is composed of 24 bits that correspond to 24 time slots of the user network interface 307. In addition, each of the bit maps is composed of three bytes that are the 0-th byte, first byte, and second bytes (thus, 24 bits). Eight bits from LSB to MSB of the 0-th byte store information of time slots #0 to #7. Eight bits from LSB to MSB of the first byte store information of time slots #8 to #15. Eight bits from LSB to MSB of the second byte store information of time slots #16 to #23.

When the frame sending and receiving portion 404 shown in FIG. 4 receives a frame for a PLN corresponding to a bit of the reception completion status representing bit map 1901 and stores it in a corresponding egress processing buffer, the bit is set to 1 by hardware (not shown). When the bit is read, it is reset to 0 by hardware (not shown). In other words, the ingress processing portion 401-1 does not need to execute the frame storing process whenever a frame reception interrupt takes place. Instead, in the frame storing process that is periodically performed, with reference to the value of each bit of the reception completion status representing bit map 1901, the ingress processing portion 401-1 can determine whether or not a frame has been received in an ingress processing buffer for a PLN corresponding to the bit.

When a PLN corresponding to each bit of the line status representing bit map 1902 is activated by a control unit (not shown), the bit is set to 1. When the PLN is deactivated, the bit is reset to 0. In other words, the ingress processing portion 401-1 can determine whether or not a PLN corresponding to each bit is in a frame receivable state with reference to the value of the bit.

When each bit of the reception completion status representing bit map 1901 is 1, the corresponding bit of the process status representing bit map 1903 is set to 1. When the ingress processing portion 401-1 obtains all frames of the ingress processing buffer corresponding to the bit to the ingress processing queue corresponding to a PLN, the bit of the process status representing bit map 1903 is reset to 0. In other words, with reference to the value of each bit of the process status representing bit map 1903, the ingress processing portion 401-1 can determine whether or not all frames received in ingress processing buffers for each PLN in the preceding period of 5 msec have been stored in an ingress processing queue corresponding to the PLN.

The ingress processing portion 401-1 of the user interface processing portion 401 processes frames for all PLNs. However, the ingress processing portion 401-1 does not need to individually determine each bit of the three bit maps shown in FIG. 19. In other words, the ingress processing portion 401-1 ORs the value in each bit position of the process status representing bit map 1903 and the value in the corresponding bit position of the reception completion status representing bit map 1901 and outputs the calculated results of the values in each bit position of these bit maps as each bit value of the new process status representing bit map 1903. Thereafter, the ingress processing portion 401-1 ANDs the value in each bit position of the new process status representing bit map 1903 and the value in the corresponding bit position of the line status representing bit map 1902 and outputs the calculated results as each bit value of the new process status representing bit map 1903. The ingress processing portion 401-1 determines whether or not to execute the frame storing process for each PLN with reference to each bit value of the process status representing bit map 1903. Thus, the ingress processing portion 401-1 can determine whether or not the frame storing process is executed at high speed. Even if a subscriber is sending frames on a particular PLN, since the node side may force deactivate the PLN, it is meaningful for the ingress processing portion 401-1 to reference the line status representing bit map 1902.

The above-described theory can be applied not only to the process for storing a frame corresponding to each PLN from an ingress processing buffer in a corresponding ingress processing queue, but also the process for transferring the frame from the ingress processing buffer to the ingress processing portion 403-1 of the ATM interface processing portion 403. In the latter case, a 24-bit map that represents whether or not a frame has been stored in the ingress processing buffer corresponding to each PLN should be prepared.

FIGS. 20 to 22 show an operational flow chart of the process for storing a frame from an ingress processing buffer to an ingress processing queue corresponding to both the theory in which the number of frames for each PLN is controlled corresponding to the number of time slots, and the theory in which bit maps are used. The ingress processing portion 401-1 of the user interface processing portion 401 executes the process of the operational flow chart shown in FIGS. 20 to 22 so that the user interface processing portion 401 processes frames for all PLNs rather than a frame for each PLN.

The process of the operational flow chart shown in FIGS. 20 to 22 is activated at each period of, for example, 5 msec, as with the case shown in FIG. 14.

At step 2001 shown in FIG. 20, the value in each bit position of the process status representing bit map 1903 and the value in the corresponding bit position of the reception completion status representing bit map 1901 are ORed. The calculated results of the values in the individual bit positions are output as bit values of the new process status representing bit map 1903.

At step 2002, the value in each bit position of the process status representing bit map 1903 calculated at step 2001 and the value in the corresponding bit position of the line status representing bit map 1902 are ANDed. The calculated results of the value in individual bit positions are output as bit values of the new process status representing bit map 1903. Thereafter, as described above, the frame transferring process for each PLN corresponding to each bit is executed with reference to each bit of the process status representing bit map 1903.

At step 2003, the value of a counter FCNT that is a variable is reset to 0. The counter FCNT counts the number of frames stored from ingress processing buffers to ingress processing queues for all PLNs in the period in which the process of the operational flow chart is executed.

At step 2004, an m-th byte (where $0 \leq m \leq 2$) of the process status representing bit map 1903 is fetched. In the following description, the m-th byte of the process status representing bit map 1903 is denoted by table(m) (where m is a variable). In the initial state, the value of m is 0. Thus, in the initial state, the 0-th byte table(0) of the process status representing bit map 1903 (see FIG. 19) is fetched.

At step 2005, it is determined whether or not the value of the variable n that represents the reference bit position of the m-th byte table(m) of the process status representing bit map 1903 is 0.

Since the value of the variable n is 0 in the initial state, the determined result at step 2005 is YES. Thus, the flow advances to step 2007.

At step 2007, it is determined whether or not the contents of the m-th byte table(m) of the process status representing bit map 1903 are 0.

When the determined result is YES, since frames have not been received in ingress processing buffers for PLNs corresponding to eight bits #(m*8) to #(m*8+7) of the m-th byte, it is not necessary to execute the frame storing process for these frames. In this case, the next byte data of the process status representing bit map 1903 at step 2021 or later is executed.

On the other hand, when the determined result at step 2007 is NO, flow advances to step 2008. At step 2008, the m-th byte table(m) of the process status representing bit map 1903 is shifted to the right by one bit. Thus, it is determined whether or not the carry flag CF=1 has been output.

When the determined result at step 2009 is NO, the value of the variable n is incremented by 1 at step 2010. The flow then returns to step 2008.

When the determined result at step 2009 is YES, the value 1 of the n-th bit represented by the variable n of the m-th byte table(m) of the process status representing bit map 1903 has been detected. In other words, it is determined that frames have been received in the ingress processing buffer for a PLN corresponding to #(m*8+n).

As a result, at step 2011 shown in FIG. 21, the contents of the ingress processing buffer for the PLN corresponding to #(m*8+n) are searched (where m is a value of the variable m and n is a value of the variable n).

At step 2012, it is determined whether or not received frames have been stored in an ingress processing buffer for a PLN corresponding to #(m*8+n) as the searched results at step 2011. At the present period, when the process at step 2011 has been executed a first time, the determined result at step 2012 is always YES.

When the determined result at step 2012 is YES, flow advances to step 2013. At step 2013, frames are read from an ingress processing buffer for a PLN corresponding to #(m*8+n). This process is the same as the process at step 1404 shown in FIG. 14. The CIR control is executed for the read frames. As a result, when frames are not discarded, the memory addresses of the frames are stored in an ingress processing queue corresponding to the PLN.

At step 2014, the valid value NP of the number of frames that can be processed for a PLN corresponding to #(m*8+n) is decremented by 1. The initial value of the valid value NP is calculated by the equation (6) and preset in a memory or the like (not shown).

At step 2015, the value of the counter FCNT that counts the number of frames read from the ingress processing buffers to the ingress processing queues for all PLNs is incremented by 1.

At step 2016, it is determined whether or not the value of the counter FCNT is equal to the valid value k that represents the number of frames for all PLNs.

When the determined result at step 2016 is NO, flow advances to step 2017. At step 2017, it is determined whether or not the valid value NP that represents the number of frames for the PLN corresponding to #(m*8+n) is 0.

When the determined result at step 2017 is NO, since frames can be obtained for the PLN corresponding to #(m*8+n), flow returns to step 2011. At step 2011, the content of the ingress processing buffer for the PLN corresponding to #(m*8+n) is searched.

With the loop of steps 2011→2016→2017→2011, the frame storing process for storing frames from the ingress processing buffer for the PLN corresponding to #(m*8+n) to the corresponding ingress processing queue is repeated. When the received frames are not present in the ingress processing buffer, the determined result at step 2012 becomes NO.

As a result, at step 2034, the n-th bit of the m-th byte table(m) of the process status representing bit map 1903 is reset to 0. Thus, unless the frame sending and receiving portion 404 stores new frames in the ingress processing buffer for the PLN corresponding to #(m*8+n) in the next or later period, and the frame storing process for the PLN is not executed.

After the process at step 2034 is executed, flow advances to step 2018. The process at step 2018 will be described later.

With the loop of steps 2011→2016→2017→2011, while the frame storing process for storing frames from an ingress processing buffer for a PLN corresponding to #(m*8+n) to the corresponding ingress processing queue is being repeated, when the valid value NP for the number of process frames for the PLN corresponding to #(m*8+n) becomes 0 and thereby the determined result at step 2017 is YES, flow advances to step 2018.

When the determined result at step 2017 is YES or after the process at step 2034 is executed, flow advances to step 2018. At step 2018, for the frame storing process for a PLN corresponding to #(m*8+n) that will be executed in the next or later period, the valid value NP for the number of process frames for the PLN is restored to the initial value calculated by the equation (6).

Thereafter, flow advances to step 2019. At step 2019, it is determined whether or not the content of the m-th byte table(m) of the process status representing bit map 1903 after the right-shift process at step 2008 is 0 (namely, all eight bit values are 0).

When the determined result is YES, since frames have not been received in the ingress processing buffers for PLNs corresponding to the rest of bits of the m-th byte, it is not necessary to execute the frame storing process for them. In this case, flow advances to step 2021. At step 2021, the controlling process for the next byte data of the process status representing bit map 1903 is executed.

When the determined result at step 2019 is NO, the value of the variable n is incremented by 1. Thereafter, flow returns to step 2008. At step 2008, the frame storing process for PLNs corresponding to the next bit positions is executed.

With the loop of steps 2011→2016→2017→2011, while the frame storing process for storing frames from an ingress processing buffer for a PLN corresponding to #(m*8+n) to the corresponding ingress processing queue is being repeated, when the value of the counter FCNT becomes equal to the valid value k for the number of process frames of all PLNs and thereby the determined result at step 2016 is YES, the processes at steps 2026 to 2033 are executed. Thus, the frame storing process for frames of all PLNs at this period is finished.

In other words, at step 2026, as with the case at step 2017, it is determined whether or not the valid value NP for the number of process frames for a PLN corresponding to #(m*8+n) is 0.

When the determined result is NO, the process of the operational flow chart shown in FIGS. 20 to 22 is finished. Thus, since the values of the variables m and n and the valid value NP have been stored, when the process of the operational flow chart shown in FIGS. 20 to 22 is activated in the next period, the frame storing process for a PLN corresponding to #(m*8+n) is restored.

At step 2004, the m-th byte table(m) of the process status representing bit map 1903 is fetched. Thereafter, when the value of the variable n is not 0 (namely, the 0-th byte of table(m) has not been referenced), since the determined result at step 2005 is NO, flow advances to step 2006. At step 2006, table(m) is shifted to the right by n bits. Thus, the reference bit position corresponding to the variable n is restored.

On the other hand, when the determined result at step 2026 is YES, the frame storing process for a PLN corresponding to #(m*8+n) has been executed the number of times corresponding to the valid value NP.

In this case, flow advances to step 2027. At step 2027, for the frame storing process for a PLN corresponding to #(m*8+n) that will be executed in the next or later period, the valid value NP is restored to the initial value calculated by the equation (6).

At step 2028, it is determined whether or not the value of the variable n is 7.

When the determined result at step 2028 is NO, flow advances to step 2029. At step 2029, the value of the variable n is incremented by 1. As a result, the process of the operational flow chart shown in FIGS. 20 to 22 is finished. Since the values of the variables m and n will be stored for the next period, when the process of the operational flow chart shown in FIGS. 20 to 22 is activated, the frame storing process for a PLN corresponding to the next bit position n of the m-th byte table(m) of the process status representing bit map 1903 is resumed. In this case, since the process at step 2006 is executed, the reference bit position corresponding to the new variable n is restored.

On the other hand, when the determined result at step 2028 is YES, the frame storing process for PLNs corresponding to all bits set with "1" in the m-th byte table(m) of the process status representing bit map 1903 has been finished.

In this case, the value of the variable m is incremented in the following manner.

At step 2030, it is determined whether or not the present value of the variable m is 2.

When the determined result at step 2030 is NO, flow advances to step 2031. At step 2031, the value of the variable m is incremented by 1. When the determined result at step 2030 is YES, flow advances to step 2032. At step 2032, the value of the variable m is reset to 0. Thereafter, flow advances to step 2033. At step 2033, the value of the variable n is reset to 0. As a result, the process of the operational flow chart shown in FIGS. 20 to 22 is finished. Thus, at the next period, the first bit of the next byte data of the process status representing bit map 1903 is accessed.

On the other hand, as described above, when the value of the m-th byte table(m) of the process status representing bit map 1903 is 0 and thereby the determined result at step 2007 or 2019 is YES, it is not necessary to execute the frame storing process for a PLN corresponding to each bit position of table(m). Thus, the process at step 2021 is executed.

The process at step 2021 to 2024 is the same as the process at steps 2030 to 2033. When the contents of the process status representing bit map 1903 (0-th byte table to 2nd byte table) are not 0 and thereby the determined result at step 2025 is NO, since the value of the counter FCNT is not equal to the valid value k for the number of process frames of all PLNs, flow returns to step 2004. At step 2004, the process for the next byte data of the process status representing bit map 1903 is executed. When the determined result at step 2025 is YES, since there are no received frames to process, the process of the operational flow charts shown in FIGS. 20 to 22 is finished.

Although the above-described preferred embodiment relates to the ingress process, the present invention is not limited thereto. Instead, the present invention can be applied for the egress process. In other words, the egress processing portion 401-2 of the user interface processing portion 401 activates a frame restoring process for restoring frames that can be processed for all PLNs and a frame transferring process for transferring the frames to the frame sending and receiving portion 404. In addition, the egress processing portion 401-2 executes the frame restoring process and the frame transferring process so that the number of frames corresponding to each PLN that can be processed accords with the number of egress processing buffers allocated to each PLN. In this case, when a bit map or the like represents whether or not ATM cells have been received from the ATM interface 308, the process can be performed at high speed.

In the above-described embodiment, the number of process frames is determined corresponding to the number of buffers allocated to each PLN in the frame relay communication method. However, the present invention is not limited to such a method. Instead, in another communication method, the number of process units of communication information can be determined corresponding to the number of buffers allocated to each data link. In this case, when a bit map or the like represents whether or not the communication information has been received, the process can be performed at high speed.

Allocating Ingress Processing Buffers to each PLN Corresponding to the Sum of CIR Values of DLCIs In the above-described embodiment, the number of ingress processing buffers are allocated corresponding to the number of time slots of each PLN (see FIG. 18). On the other hand, the number of ingress processing buffers may be allocated corresponding to the sum of CIR values of DLCIs of each PLN. Moreover, instead of the sum of CIR values, a contracted amount may be used.

Figure 23:
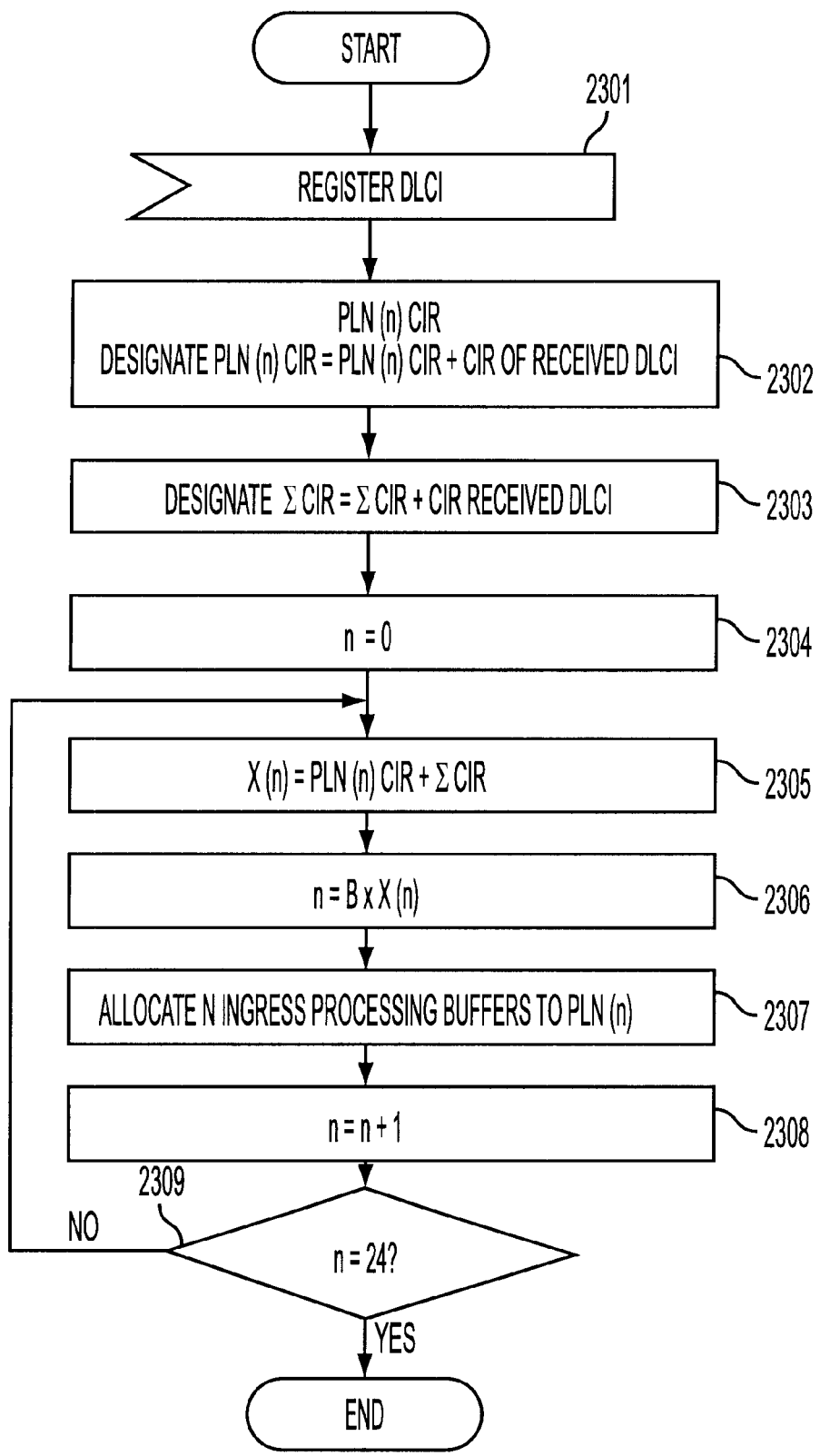
FIG. 23 is an operational flow chart showing a buffer allocating process for an ingress process for each PLN corresponding to the sum of CIR values of each DLCI on a PLC.

FIG. 23 is an operational flow chart showing an allocating process for allocating ingress processing buffers corresponding to the sum of CIR values of DLCIs of each PLN. The ingress processing portion 401-1 of the user interface processing portion 401 in the frame relay node unit 302 shown in FIG. 4 executes the process of the operational flow chart shown in FIG. 23.

At step 2301, a notification of the registration of a DLCI is received from a control unit (not shown). This notification includes a PLN of the registered DLCI and a CIR value corresponding to the DLCI.

At step 2302, the CIR value corresponding to the registered DLCI received at step 2301 is added to the sum value PLN(n)CIR of the CIR values of the PLNs.

At step 2303, the CIR value corresponding to the registered DLCI received at step 2301 is added to the sum $\Sigma$CIR of the CIR values of all the PLNs of the frame relay node unit 302.

At step 2304, the value of the variable n is reset to 0. The value n represents up to 24 PLNs managed by the frame relay node unit 302.

At step 2305, the ratio of the new sum $\Sigma$CIR of the CIR values of the DLCIs of all the PLNs of the frame relay node unit 302 and the new sum value PLN(n)CIR of the CIR values of the DLCIs of the n-th PLN(n) is calculated.

At step 2306, the ratio X(n) calculated at step 2305 is multiplied by the sum of the ingress processing buffers of the buffer memory of the frame relay node unit 302. Thus, the number of ingress processing buffers, N, allocated to the n-th PLN(n) is calculated.

At step 2307, the ingress processing buffers corresponding to the value N calculated at step 2306 are allocated to the n-th PLN(n).

At step 2308, the value of the variable n is incremented by 1. Until it is determined that the value of the variable n is equal to 24 at step 2308, the loop from step 2305 to 2308 is repeated for each PLN(n) corresponding to the value of the variable n.

When the determined result at step 2309 is YES, the process of the operational flow chart shown in FIG. 23 is finished.

In the above-described preferred embodiment, the ingress processing buffers are designated to a PLN corresponding to the sum of the CIR values of DLCIs in the frame relay communication method. However, the present invention is not limited to such a method. Instead, in another communication method, the communication buffers may be allocated corresponding to the traffic control amount such as a declared amount of traffic or the like.

Frame Storing Process and Frame Transferring Process Having Control Construction Corresponding to the Sum of CIR Values of DLCIs of each PLN and Control Construction using Bit Map The buffer allocating method shown in the operational flow chart of FIG. 23 can be directly applied for the frame storing process shown in the operational flow chart of FIGS. 20 to 22.

In other words, according to the above-described embodiment, the number of frames to be processed for each PLN is controlled corresponding to the number of time slots to be used for the PLN. However, the number of frames for each PLN may be controlled corresponding to the sum of the CIR values corresponding to DLCIS for each PLN.

In this case, the valid value NP for the number of frames for each PLN used in the process of the operational flow chart shown in FIGS. 20 to 22 can be calculated by multiplying the number k of frames that can be processed for all the PLNs in a period of 5 msec by the ratio N/B of the total number of buffers, B, and the number of bytes, N, allocated to each PLN calculated in the operational flow chart shown in FIG. 23.

The above-described theory can be applied for not only the process for storing frames from an ingress processing buffer for each PLN in the corresponding ingress processing queue in a period of 5 msec, but also the process for transferring the frames from the ingress processing queue to the ingress processing portion 403-1 of the ATM interface processing portion 403.

Traffic Data Collecting Process

In the frame relay communication method, traffic data is collected and statistically processed for each user network interface 307, each PLN, and each DLCI.

Conventionally, when such a process is executed, all statistical items for each collecting point of each traffic data are periodically collected. With the collected results, counters (variables) corresponding to all statistical items for each collecting point of each traffic data are summed. The counters are provided in a memory (not shown).

Figure 24:
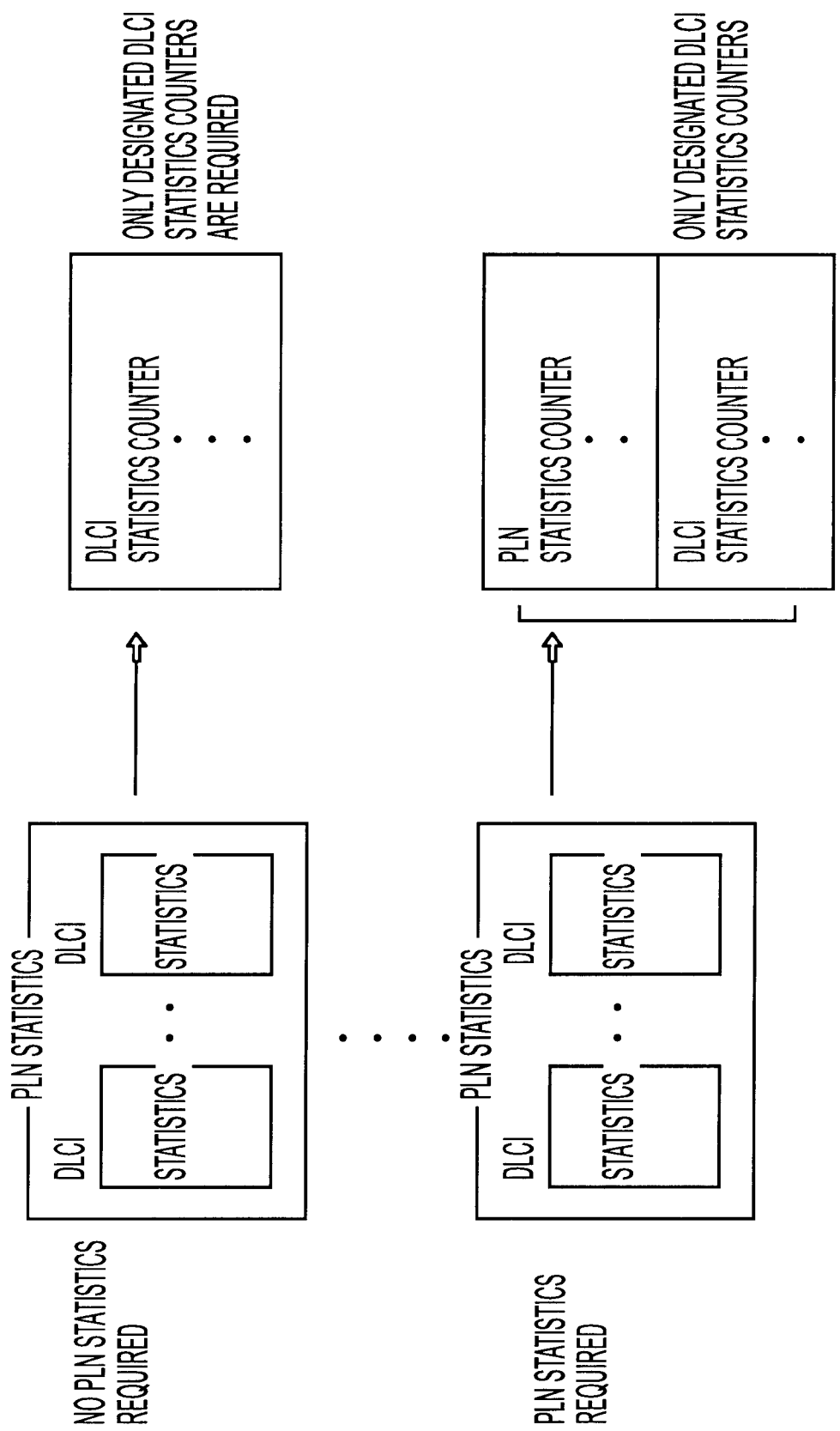
FIG. 24 is a schematic diagram for explaining a traffic data collecting process.

On the other hand, according to the preferred embodiment, a control unit (not shown) causes the frame relay node unit 302 to designate whether or not to execute the statistical process for the statistical items for each PLN and for each DLCI. Only designated statistical items for each collecting point of each traffic data are periodically collected. Corresponding to the collected results, the counters in the memory count up as shown in FIG. 24.

Thus, the communication process time and memory capacity for collecting traffic data can be reduced.

Such a traffic data collecting method can be applied for the case that statistical items such as performance information are collected for each subscriber as in a conventional switching system. In other words, traffic data can be collected only from a designated subscriber.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A traffic control apparatus, comprising:

a communication buffer allocating unit allocating, to each of a plurality of data links for performing a frame relay communication, a communication buffer having a storage capacity according to a number of time slots of a physical channel used by each of the data links;

a periodical communication process executing unit periodically executing a communication process of frames in the frame relay communication;

a total processing frame number restricting unit restricting the number of frames, for which the communication process is executed by said periodical communication process executing unit on all of the data links within one period; and an each data link processing frame number restricting unit restricting a number of frames, which are processed by being communicated on each of the data links within one period, according to the storage capacity of the communication buffer that said communication buffer allocating unit allocates to each of the data links.

2. A traffic control apparatus, comprising:

a communication buffer allocating unit allocating, to each of a plurality of data links for performing the frame relay communication, a communication buffer having a storage capacity according to a contracted amount of frame communication on each of the data links; and an each data link processing frame number restricting unit restricting a number of frames being processed by being communicated on each of the plurality of data links according to the storage capacity of the communication buffer that said communication buffer allocating unit allocates to each of the data links.

3. The traffic control apparatus according to claim 2, further comprising:

a periodical communication process executing unit periodically executing a communication process of frames in a frame relay communication;

a total processing frame number restricting unit restricting a number of frames, for which the communication process is executed by said periodical communication process executing unit on all of the data links within one period; and an each data link processing frame number restricting unit restricting a number of frames, which are processed by being communicated on each of the data links within one period, according to the storage capacity of the communication buffer that said communication buffer allocating unit allocates to each of the data links.

4. A traffic control apparatus, comprising:

a reception completion representing bit map unit storing, for each of a plurality of data links, bit information that represents whether or not communication information has been received by each of the plurality of data links at a bit position corresponding to each of the plurality of data links;

a link status representing bit map unit storing, for each of the plurality of data links, bit information that represents whether or not each of the plurality of data links is valid at a bit position corresponding to each of the plurality of data links; and a communication process executing unit executing a communication process for each data link corresponding to a bit position, only when the bit position within said reception completion representing bit map unit represents that communication information has been received by the data link corresponding to the bit position.

5. A traffic control apparatus, comprising:

a reception completion representing bit map unit storing, for each of a plurality of data links, bit information that represents whether or not communication information has been received by each of the plurality of data links at a bit position corresponding to each of the plurality of data links;

a link status representing bit map unit storing, for each of the plurality of data links, bit information that represents whether or not each of the plurality of data links is valid at the bit position corresponding to each of the plurality of data links; and a communication process executing unit executing a communication process for each data link corresponding to a bit position, only when the bit position within said link status representing bit map unit represents that the data link corresponding to the bit position is valid.

6. A traffic control apparatus, comprising:

a reception completion representing bit map unit for storing bit information that represents whether or not communication information for each of a plurality of data links has been received with a first logical value 1 or 0 at a bit position corresponding to each data link;

a link status representing bit map unit for storing bit information that represents whether or not each data link is valid with a second logical value 1 or 0 at the bit position corresponding to the data link; and a communication process commanding unit for ANDing said first logical value at each bit position of said reception completion representing bit map unit and said second logical value at a corresponding bit position of said link status representing bit map unit, and commanding the communication process for a data link only when the ANDed value at a resultant bit position corresponding to a data link is 1.

7. A traffic control apparatus, comprising:

a communication buffer allocating unit allocating, to each of data links for performing a communication, a communication buffer having a storage capacity according to a transmission band used by each of the data links;

a periodical communication process executing unit periodically executing a communication process of communication information;

a total communication processing number restricting unit restricting the number of pieces of communication information communicated on all of the data links, for which the communication process is executed by said periodical communication process executing unit within one period; and an each data link communication information processing number restricting unit restricting the number of pieces of communication information, which are communicated on each of the data links within one period, according to a storage capacity of a communication buffer that said communication buffer allocating unit allocates to each of the data links.

8. The traffic control apparatus according to claim 7, further comprising:

an each data link communication information processing number restricting unit restricting the number of pieces of communication information processed by being communicated on each of the data links according to a storage capacity of a communication buffer that said communication buffer allocating unit allocates to each of the data links.

9. A traffic control apparatus, comprising:

a communication buffer allocating unit allocating, to each of data links for performing the communication, a communication buffer having a storage capacity according to a traffic control amount on each of the data links; and an each data link communication information processing number restricting unit restricting the number of pieces of communication information processed by being communicated on each of the data links according to the storage capacity of the communication buffer that said communication buffer allocating unit allocates to each of the data links.

10. The traffic control apparatus according to claim 9, further comprising:

a periodical communication process executing unit periodically executing a communication process of communication information;

a total communication processing number restricting unit restricting a number of pieces of communication information communicated on all of the data links, for which the communication process is executed by said periodical communication process executing unit within one period; and an each data link communication information processing number restricting unit restricting the number of pieces of communication information, which are communicated on each of the data links within one period, according to a storage capacity of a communication buffer that said communication buffer allocating unit allocates to each of the data links.

* * * * *